(12) United States Patent
Fiorentini et al.

(10) Patent No.: US 10,664,546 B2
(45) Date of Patent: May 26, 2020

(54) TECHNIQUES FOR URL ARCHIVING WHILE BROWSING A WEB PAGE

(71) Applicant: Facebook, Inc., Menlo Park, CA (US)

(72) Inventors: Vincent Lee Fiorentini, Seattle, WA (US); Ming Fei Li, Seattle, WA (US); Prakash Ahuja, Redmond, WA (US); Yue Cai, Kirkland, WA (US); Sean Michael Wiese, Seattle, WA (US); Yi-Lin Jao, Seattle, WA (US); Ziqin Wang, Seattle, WA (US)

(73) Assignee: FACEBOOK, INC., Menlo Park, CA (US)

( * ) Notice: Subject to any disclaimer, the term of this patent is extended or adjusted under 35 U.S.C. 154(b) by 47 days.

(21) Appl. No.: 15/836,468

(22) Filed: Dec. 8, 2017

(65) Prior Publication Data

US 2019/0179967 A1 Jun. 13, 2019

(51) Int. Cl.
*G06F 16/955* (2019.01)
*H04L 29/08* (2006.01)
(Continued)

(52) U.S. Cl.
CPC ........ *G06F 16/9566* (2019.01); *G06F 16/954* (2019.01); *G06F 16/957* (2019.01);
(Continued)

(58) Field of Classification Search
CPC .............................. H04L 51/32; H04L 67/306
See application file for complete search history.

(56) References Cited

U.S. PATENT DOCUMENTS 8,356,012 B2 *  1/2013  Stapleton ............... G06F 17/211
                                                              707/640
9,652,541 B1 *  5/2017  Amacker ............ G06F 3/04817
(Continued)

OTHER PUBLICATIONS

"Create Your Thinking Corner", Available online at https://www.thinkover.com/, accessed on internet on Apr. 3, 2018, 2017, 6 pages.
(Continued)

*Primary Examiner* — Lashonda T Jacobs
(74) *Attorney, Agent, or Firm* — Kilpatrick Townsend & Stockton LLP

(57) ABSTRACT

Techniques are provided for enhancing a user's browsing experience, especially when the user is browsing third party websites via an application. For example, a user may use the application to browse web pages served from a third party website that is associated with a particular domain. While browsing the third party web pages, the user may save a URL corresponding to a third party web page that the user is currently viewing. In this manner, the user may store one or more URLs corresponding to web pages served from the third party website and/or served from multiple different third party domains browsed by the user. The saved URLs may be associated with the user. When the user browses web pages associated with a particular domain, a user selectable option may be provided that enables the user to see URLs stored for the user that are associated with that particular domain. The user may then select a particular displayed URL to access the web page corresponding to the selected URL.

22 Claims, 16 Drawing Sheets

(51) Int. Cl.
*G06F 16/954* (2019.01)
*G06F 16/957* (2019.01)
*H04L 12/58* (2006.01)
*G06Q 50/00* (2012.01)

(52) U.S. Cl.
CPC ...... *G06F 16/9562* (2019.01); *G06F 16/9574* (2019.01); *H04L 51/32* (2013.01); *H04L 67/306* (2013.01); *G06Q 50/01* (2013.01)

(56) References Cited

U.S. PATENT DOCUMENTS

| | | | | |
|---|---|---|---|---|
| 2008/0162431 | A1* | 7/2008 | Xu | G06F 16/957 |
| 2009/0049070 | A1* | 2/2009 | Steinberg | G06Q 10/107 |
| 2010/0131385 | A1* | 5/2010 | Harrang | G06Q 30/00 |
| | | | | 705/26.1 |
| 2012/0011432 | A1* | 1/2012 | Strutton | G06Q 30/02 |
| | | | | 715/234 |
| 2012/0290429 | A1* | 11/2012 | Ostroff | G06F 8/34 |
| | | | | 705/26.5 |
| 2013/0029768 | A1* | 1/2013 | Eichstaedt | G06Q 50/01 |
| | | | | 463/42 |
| 2013/0031034 | A1* | 1/2013 | Gubin | G06Q 10/06393 |
| | | | | 706/12 |
| 2013/0054617 | A1* | 2/2013 | Colman | G06Q 10/10 |
| | | | | 707/748 |
| 2013/0086641 | A1* | 4/2013 | Mehr | G06F 21/45 |
| | | | | 726/4 |
| 2013/0198821 | A1* | 8/2013 | Hitchcock | G06F 21/335 |
| | | | | 726/6 |
| 2013/0311875 | A1* | 11/2013 | Pappas | G06F 17/2247 |
| | | | | 715/234 |
| 2014/0129733 | A1* | 5/2014 | Klais | H04L 67/327 |
| | | | | 709/239 |
| 2014/0136441 | A1* | 5/2014 | Agarwalla | G06Q 30/0241 |
| | | | | 705/344 |
| 2014/0156665 | A1* | 6/2014 | Kraley | G06F 16/285 |
| | | | | 707/739 |
| 2014/0181193 | A1* | 6/2014 | Narasimhan | H04L 67/306 |
| | | | | 709/204 |
| 2014/0195930 | A1* | 7/2014 | Rajagopal | G06F 3/0484 |
| | | | | 715/753 |
| 2015/0066654 | A1* | 3/2015 | Kannan | G06Q 30/0271 |
| | | | | 705/14.66 |
| 2015/0195330 | A1* | 7/2015 | Lee | H04L 67/02 |
| | | | | 709/204 |
| 2016/0042069 | A1* | 2/2016 | Lee-Goldman | G06F 16/951 |
| | | | | 707/706 |
| 2016/0142382 | A1* | 5/2016 | Ziebell | H04L 63/0428 |
| | | | | 713/168 |
| 2017/0289288 | A1* | 10/2017 | Marra | G06F 16/9535 |
| 2018/0048696 | A1 | 2/2018 | Li et al. | |
| 2018/0097763 | A1* | 4/2018 | Garcia | G06Q 30/06 |
| 2018/0144362 | A1* | 5/2018 | Ketchpaw | G06Q 30/0239 |
| 2018/0246983 | A1* | 8/2018 | Rathod | H04L 63/102 |
| 2018/0276367 | A1* | 9/2018 | Benson | G06F 21/36 |
| 2018/0336574 | A1* | 11/2018 | Mohan | G06Q 30/0201 |

OTHER PUBLICATIONS

"Create Your Thinking Corner," thinkover, Copyright 2017, retrieved from https://www.thinkover.com on Apr. 3, 2018, 6 pages.

* cited by examiner

TECHNIQUES FOR URL ARCHIVING WHILE BROWSING A WEB PAGE

BACKGROUND

Given the popularity of Internet browsing, some applications enable their users to browse third party websites via the applications, where the applications are provided by providers that are distinct from the providers of the third party websites. For example, a social networking application in conjunction with a social networking system (SNS) may enable its users to interact with and share web pages. For example, a user, using the social networking application, may post content that may be viewed by one or more other users of the SNS. In some cases, the content may include links to web pages hosted by other third-party-provided systems that are distinct from the SNS. When a user clicks on such a link via the social networking application, the web page corresponding to the link is retrieved (potentially facilitated by the SNS) and the retrieved web page then presented to the user. Such applications that provide such third party websites browsing functionality are always looking for new services to provide its users to enhance the users' experience.

SUMMARY

The present disclosure relates generally to techniques for enhancing a user's browsing experience. More particularly, techniques are described that enable a user, while browsing via an application, to archive a Uniform Resource Locator (URL) corresponding to a page browsed by the user from a third party website, and to subsequently use the archived URL to obtain the corresponding web page. The provider of the third party website may be distinct from the provider of the application. Various inventive embodiments are described herein, including methods, systems, non-transitory computer-readable storage media storing programs, code, or instructions executable by one or more processors, and the like.

In certain embodiments, techniques are provided for enhancing a user's browsing experience, especially when the user is browsing third party websites via an application (e.g., a social networking application) unrelated to the third party websites. For example, a user may use the application to browse web pages served from a third party domain (e.g., from a website hosted by a third party system). While browsing the third party web pages, the user may save (e.g., via a user-selectable, SAVE button) a URL corresponding to a third party web page that the user is currently viewing or accessing. In certain embodiments, the user may store one or more URLs to webpages served from the third party domain. In a like manner, the user may store URLs to webpages served from multiple different third party domains browsed by the user. The saved URLs may be associated with the user (e.g., with an identity of the user maintained by a social networking system (SNS)).

When the user browses a particular domain, a user selectable option (e.g., an ACCESS button) may be provided that enables the user to see information regarding URLs stored for the user for that particular domain. The user may then select a particular displayed URL to access a web page corresponding to the selected URL.

The SAVE button may be implemented by either the SNS or by the third party website/system. When the SAVE button is implemented by the SNS, the SNS may identify a URL of a current web page when the SAVE button is selected. The URL may then be stored such that the URL is associated with the user.

When the SAVE button is implemented by the third party website/system, the third party website/system may obtain an identity of a user from the SNS. The identity may be obtained at the beginning of an interaction with the user or when the user selects the SAVE button. After the identity is obtained and the SAVE button is selected, the third party website/system may identify a URL of a current web page and send the URL to the SNS to be associated with the user. When sending the URL to the SNS, the identity may be included such that the SNS may identify the user to associate the URL with. In some embodiments, one or more URLs may be sent to the SNS at a time.

The ACCESS button may be implemented by the SNS or by the third party website/system. When the ACCESS button is implemented by the SNS, the SNS may compare URLs stored for the user with a URL of a current web page when the ACCESS button is selected. URLs that have the same domain as the URL of the current web page may be presented to the user.

When the ACCESS button is implemented by the third party website/system, the third party website/system may obtain an identity of the user from the SNS when the ACCESS button is selected. The identity may be obtained at the beginning of an interaction with the user or when the user selects the ACCESS button. After the identity is obtained and the ACCESS button is selected, the third party website/system may send a URL of a current web page to the SNS with the identity. The SNS may determine one or more URLs stored for the user that have the same domain as the URL of the current web page. The one or more URLs may then be sent to the third party website/system so that that the third party website/system may present the one or more URLs to the user.

According to embodiments described above, techniques may be provided for providing a save operation. For examples, techniques may include receiving a request to perform a save operation for a web page being displayed by a user device. The request may be received at a first system from the user device. In response to the request, an Uniform Resource Locator (URL) associated with the web page may be determined by the first system. A user account may also be determined based upon the request. For example, the request may include an identification of the user account. The user account may be associated with the first system (e.g., the user account may be a user account of multiple user accounts maintained by the first system). The first system or a second system (e.g., a system hosting the web page) may then cause information identifying the URL to be stored and associated with the user account. After the information is stored, the first system may send a message to the user device indicating successful completion of the save operation.

In some examples, the request may be sent to the first system in response to receiving information indicating selection of a first user-selectable option (e.g., a button) by a user of the user device. The first user-selectable option may be displayed by the user device when the web page is displayed by the user device. Either the first system or a second system cause the first user-selectable option to be displayed. The web page may be presented by the user device after the first system receives information identifying the URL, the first system obtains the web page from a second system, and the web page is communicated to the user device from the first system.

In some examples, in addition to or instead of the first user-selectable option, a second user-selectable option may be displayed by the user device. The first system may receive information indicating selected of the second user-selectable option. In response to receiving the information indicating selection of the second user-selectable option, a current URL may be determined. The current URL may be associated with a web page being displayed by the user device when the second user-selectable option was selected. The first system may then identify a domain for the current URL, and, based upon the domain, identify one or more URLs stored for and associated with the user account. The first system may communication information identifying the one or more URLS to the user device. The first system may then receive information indicating selection of a particular URL of the one or more URLs. In response to the information, the first system may communicate a particular web page corresponding to the particular URL to the user device. In some examples, the particular web page may be obtained from a web site storing the particular web page.

According to embodiments described above, techniques may be provided for providing an access operation. For examples, techniques may include receiving information indicating selection of a second user-selectable option (e.g., a button) displayed by a user device. The information may be sent from the user device to a first (i.e., where the information is received). Responsive to receiving the information indicating selection of the second user-selectable option, a current Uniform Resource Locator (URL) may be determined. The current URL may be associated with a web page being displayed by the user device when the second user-selectable option was selected. In some examples, the current URL is included in the information.

The first system may then identify a domain for the current URL, and, based upon the domain, identify one or more URLs stored for and associated with a user account, where each URL in the one or more URLs is associated with the domain. The user account may be an user account of multiple user accounts maintained by the first system.

The first system may communicate information identifying the one or more URLs to the user device. Later, the first system may receive information indicating selection of a particular URL from the user device. The particular URL may be a URL from the one or more URLs. The first system may then communicate a particular web page corresponding to the particular URL to the user device. In some examples, the particular web page may be obtained from a web site storing the particular web page (e.g, a second system).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

DETAILED DESCRIPTION

Figure 1:
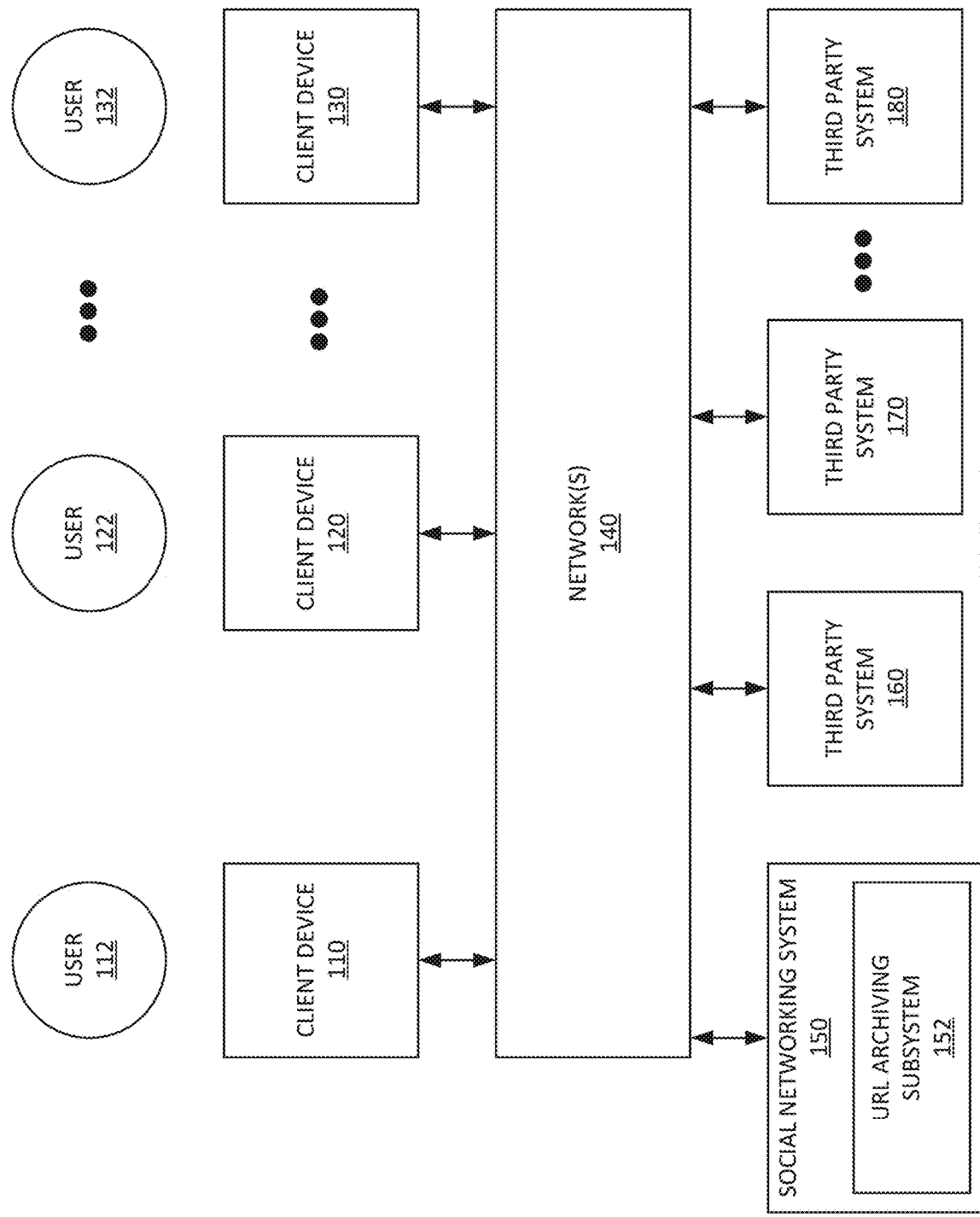
FIG. 1 is a simplified block diagram of a distributed environment according to certain embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to techniques for enhancing a user's browsing experience. More particularly, techniques are described that enable a user, while browsing via an application, to archive a Uniform Resource Locator (URL) corresponding to a page browsed by the user from a third party website, and to subsequently use the archived URL to obtain the corresponding web page. The provider of the third party website may be distinct from the provider of the application. Various inventive embodiments are described herein, including methods, systems, non-transitory computer-readable storage media storing programs, code, or instructions executable by one or more processors, and the like.

In certain embodiments, techniques are provided for enhancing a user's browsing experience, especially when the user is browsing third party websites via an application (e.g., a social networking application) unrelated to the third party websites. For example, a user may use the application to browse web pages served from a third party domain (e.g., from a website hosted by a third party system). While browsing the third party web pages, the user may save (e.g., via a user-selectable, SAVE button) a URL corresponding to a third party web page that the user is currently viewing or accessing. In certain embodiments, the user may store one or more URLs to webpages served from the third party domain. In a like manner, the user may store URLs to webpages served from multiple different third party domains browsed by the user. The saved URLs may be associated with the user (e.g., with an identity of the user maintained by a social networking system (SNS)).

When the user browses a particular domain, a user selectable option (e.g., an ACCESS button) may be provided that enables the user to see information regarding URLs stored for the user for that particular domain. The user may then select a particular displayed URL to access a web page corresponding to the selected URL.

The SAVE button may be implemented by either the SNS or by the third party website/system. When the SAVE button is implemented by the SNS, the SNS may identify a URL of a current web page when the SAVE button is selected. The URL may then be stored such that the URL is associated with the user.

When the SAVE button is implemented by the third party website/system, the third party website/system may obtain an identity of a user from the SNS. The identity may be obtained at the beginning of an interaction with the user or when the user selects the SAVE button. After the identity is obtained and the SAVE button is selected, the third party website/system may identify a URL of a current web page and send the URL to the SNS to be associated with the user. When sending the URL to the SNS, the identity may be included such that the SNS may identify the user to associate the URL with. In some embodiments, one or more URLs may be sent to the SNS at a time.

The ACCESS button may be implemented by the SNS or by the third party website/system. When the ACCESS button is implemented by the SNS, the SNS may compare URLs stored for the user with a URL of a current web page when the ACCESS button is selected. URLs that have the same domain as the URL of the current web page may be presented to the user.

When the ACCESS button is implemented by the third party website/system, the third party website/system may obtain an identity of the user from the SNS when the ACCESS button is selected. The identity may be obtained at the beginning of an interaction with the user or when the user selects the ACCESS button. After the identity is obtained and the ACCESS button is selected, the third party website/system may send a URL of a current web page to the SNS with the identity. The SNS may determine one or more URLs stored for the user that have the same domain as the URL of the current web page. The one or more URLs may then be sent to the third party website/system so that that the third party website/system may present the one or more URLs to the user.

FIG. 1 is a simplified block diagram of a distributed environment according to certain embodiments. The distributed environment includes a number of client devices (sometimes referred to as "client systems," "client computers," or "clients") 110, 120, . . . 130 communicably connected to social networking system (SNS) 150 by one or more networks 140 (e.g., the Internet, cellular telephone networks, mobile data networks, other wide area networks, local area networks, metropolitan area networks, or the like). In some embodiments, one or more networks 140 include a public communication network (e.g., the Internet and/or a cellular data network), a private communications network (e.g., a private LAN or leased lines), or a combination of such communication networks.

Client devices 110, 120, . . . 130 may be computing devices such as smart watches, personal digital assistants, portable media players, smart phones, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), and/or other appropriate computing devices that may be used to communicate with SNS 150. In some embodiments, SNS 150 is a single computing device such as a server, while in other embodiments, SNS 150 is implemented by multiple computing devices working together to perform the actions of a server system (e.g., cloud computing).

Users 112, 122, . . . 132 may employ client devices 110, 120, . . . 130 to access SNS 150 and to participate in a corresponding social networking service provided by SNS 150. For example, one or more of client devices 110, 120, . . . 130 execute software applications that are specific to the social networking service (e.g., social networking "apps" running on smart phones or tablets). In some embodiments, SNS 150 is a server system for a social networking service provider In such embodiments, SNS 150 may provide access to at least some services and/or features associated with third party providers. For example, as further described below, SNS 150 may include URL archiving subsystem 152 for archiving URLs corresponding to web pages that are viewed using SNS 150. In alternative embodiments, URL archiving subsystem 152 may be a separate system from SNS 150. In such an embodiment, URL archiving subsystem 152 may be in communication with SNS 150 and may user information stored by SNS 150 or provide information to SNS 150. For example, SNS 150 may use services provided by URL archiving subsystem 152 to enhance the browsing experience of users of SNS 150.

Users interacting with client devices 110, 120, . . . 130-$n$ may participate in the social networking service provided by SNS 150 by providing and/or consuming (e.g., posting, writing, viewing, publishing, broadcasting, promoting, recommending, sharing, commenting on, liking) digital content, such as text comments (e.g., statuses, updates, posts, announcements, replies, location "check-ins," private/group messages), photos, videos, audio files, links (e.g., to web pages, articles, pages associated with third party service providers, etc.), documents, advertisements, and/or other electronic content.

Users of the social networking service may also annotate information posted by other users of the social networking service (e.g., endorsing or "liking" a posting of another user, commenting on a post by another user or publishing source, and/or providing other types of user feedback). In some embodiments, information may be posted on a user's behalf by systems and/or services external to SNS 150. For example, a user may post a review of a movie to a movie-review website, and with proper permissions that website may cross-post the review to SNS 150 on the user's behalf.

In connection with using or participating in a social networking service, the digital content that users may consume, provide, and/or otherwise interact with is accessible through various features or entry points of the social networking service. For example, digital content may be accessible and presented via one or more pages, feeds (e.g., a newsfeed, a user wall, a timeline, a notifications section for highlighting new/updates to digital content, etc.), applications, and/or other interfaces for specific types of digital content (e.g., interfaces for accessing private messages, accessing saved social networking content, searching for social networking content, etc.) maintained by and within the social networking service. As described throughout, pages associated with third party providers may be linked to in various ways (e.g., within a user post in a feed, a notification, a private message between users, etc.).

In some embodiments, a software application executing on a mobile client device, with proper permissions, may obtain information from hardware resources/components of the client device. For example, global positioning system (GPS) or other geo-location capabilities (e.g., Wi-Fi or hybrid positioning systems) may be accessed by a software application on the client device to determine the user's location and update SNS 150 with the user's location (e.g., "At Home," "At Work," or "In San Francisco, Calif."), and/or update SNS 150 with information derived from and/or based on the user's location. Users interacting with client devices 110, 120, . . . 130 may also use the social networking service provided by SNS 150 to define groups of users. Users interacting with client devices 110, 120, . . . 130 may also use the social networking service provided by SNS 150 to communicate and collaborate with each other.

In some embodiments, the distributed environment may also include third party systems 160, 170, . . . 180. In some implementations, third party systems are associated with third party service providers who provide services and/or features to users of a network (e.g., users of SNS 150). For example, in some embodiments, a third party system may be used to host a third party website that provide pages to client devices 110, 120, . . . 130, either directly or in conjunction with SNS 150. In some embodiments, a third party system may be used to host third party applications that are used by client devices 110, 120, . . . 130, either directly or in conjunction with SNS 150.

In some embodiments, users may access third party services by loading web pages associated with third party service providers within an application for a service provider distinct from the third party service providers (e.g., by selecting links provided within a web page from SNS 150 to access web pages of a third party service). Web pages are a type of digital document that may include markup language, such as Hyper Text Markup Language (HTML), Extensible Markup Language (XML), Java, etc.).

Web pages may also include one or more scripts (e.g., JavaScript inserted into the web page by SNS 150) for calling one or more application programming interfaces (APIs) of a server system for the social networking service (e.g., one or more APIs of SNS 150) to obtain user information (e.g., location information, payment credentials, profile information, etc. collected and stored in connection with using the social networking service). A script may be executed at some time during a user's interaction with the loaded web page (e.g., when the web page is loaded, in response to a detected interaction within a loaded web page, etc.).

A script may allow user information maintained by the social networking service to be leveraged in transactions conducted between users and third party service providers. These implementations provide a more efficient, integrated, and seamless alternative to accessing third party services and features via stand-alone, third party applications, while optionally leveraging user information maintained in connection with other service providers in a network (e.g., a social networking service provided by SNS 150).

Exemplary third party services (e.g., provided by third party service providers) include, but are not limited to, services, products, and/or applications for or related to: books, business, communication, contests, e-commerce (e.g., pages for purchasing goods or services from online retailers), education, entertainment, fashion, finance, food and drink, games, health and fitness, lifestyle, local information (e.g., web pages for real-time viewing of mass transit schedules), movies (e.g., web pages for movie reviews, purchasing movie tickets, etc.), television, music and audio, news, photos, video, productivity, reference material, security, shopping, sports, travel, utilities, and the like. In some embodiments, a third party system is used to host enterprise systems, which are used by client devices 110, 120, . . . 130, either directly or in conjunction with SNS 150. In some embodiments, a third party system is used to provide third party content (e.g., news articles, reviews, message feeds, etc.).

In some embodiments, a third party system is a single computing device (e.g., server computer), while in other embodiments, a third party system is implemented by multiple computing devices working together to perform the actions of a server system (e.g., cloud computing).

Figure 2:
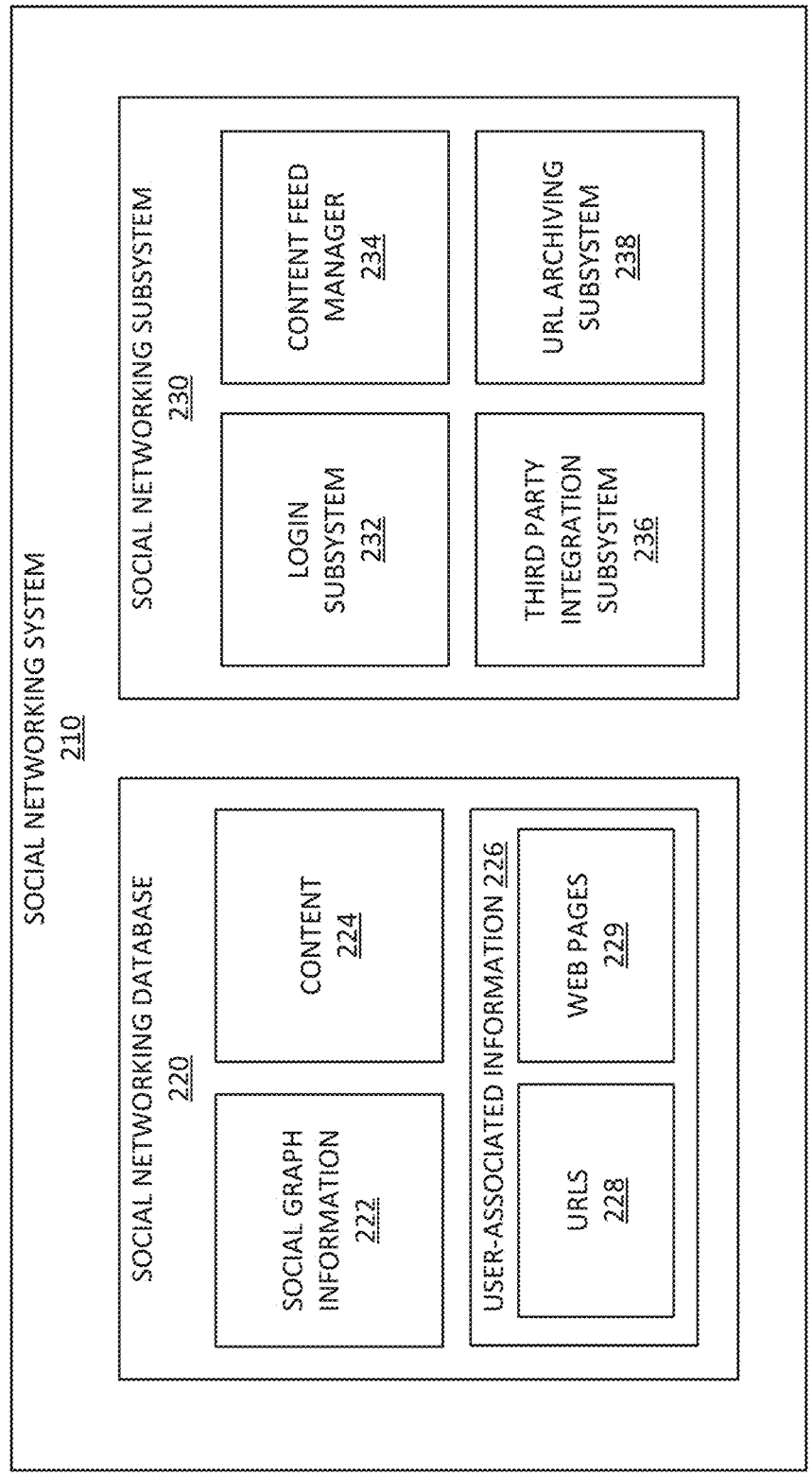
FIG. 2 is a simplified block diagram of a social networking system according to certain embodiments.

FIG. 2 is a simplified block diagram of social networking system (SNS) 210 according to certain embodiments. SNS 210 typically includes one or more processing units (processors or cores), one or more network or other communications interfaces, memory, and one or more communication buses for interconnecting these components. The communication buses optionally include circuitry (sometimes called a chipset) that interconnects and controls communications between system components. SNS 210 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

The memory of SNS 210 may include high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. The memory may optionally include one or more storage devices remotely located from the processor(s). Memory, or alternately the non-volatile memory device(s) within the memory, includes a non-transitory computer-readable storage medium. In some embodiments, the memory or the computer-readable storage medium of the memory may store one or more of the following programs, subsystems, and/or data structures, or a subset or superset thereof: an operating system (not illustrated), a network communication subsystem (not illustrated), social networking database 220, social networking subsystem 230, a search subsystem (not illustrated), any combination thereof, or the like.

The operating system may include procedures for handling various basic system services and for performing hardware dependent tasks. The network communication subsystem may be used for connecting SNS 210 to other devices or systems via one or more communication network interfaces (wired or wireless) and one or more communication networks (e.g., one or more networks 140 as illustrated in FIG. 1). The search subsystem may enable users of SNS 210 to search for content and other users of SNS 210.

Social networking database 220 may be for storing data associated with the social networking service, such as social graph information 222; content 224 (e.g., user content or news articles), and user-associated information 226.

Social graph information 222 may include a graph database with entity information represented as nodes in the graph database and connection information represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities. In some embodiments, the nodes also include pointers or references to other objects, data structures, or resources for use in rendering content in conjunction with the rendering of the pages corresponding to the respective nodes at clients. The graph database may utilize one or more types of databases, such as graph, dimensional, flat, hierarchical, network, object-oriented, relational, and/or XML databases.

Entity information, as recited above, may include user information, such as user profiles, login information, privacy and other preferences, biographical data, and the like. In some embodiments, for a given user, the user information includes the user's name, profile picture, contact information, birth date, sex, marital status, family status, employment, education background, preferences, interests, and/or other demographic information. Entity information 222 may further include information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. Entity information may further include information about a resource, such as an audio file, a video file, a digital photo, a text file, a structured document (e.g., web page), or an application. In some embodiments, the resource is located in SNS 210 (e.g., in content 226) or on an external server, such as a third party system.

Connection information, as recited above, may include information about the relationships between entities in social networking database 220. In some embodiments, the connection information may include information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, SNS 210 transmits a "friend request" to the second user. If the second user confirms the "friend request," SNS 210 creates and stores an edge connecting the first user's user node and the second user's user node in a graph database as connection information that indicates that the first user and the second user are friends. In some embodiments, connection information represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like" or have "attended," "played," "listened," "cooked," "worked at," or "watched" the entity at the other node. The page in the social networking service that corresponds to the entity at the other node may include, for example, a selectable "like," "check in," or "add to favorites" icon. After the user clicks one of these icons, SNS 210 may create a "like" edge, "check in" edge, or a "favorites" edge in response to the corresponding user action. As another example, the user may listen to a particular song using a particular application (e.g., an online music application). In this case, SNS 210 may create a "listened" edge and a "used" edge between the user node that corresponds to the user and the entity nodes that correspond to the song and the application, respectively, to indicate that the user listened to the song and used the application. In addition, SNS 210 may create a "played" edge between the entity nodes that correspond to the song and the application to indicate that the particular song was played by the particular application.

Content 224 may include text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content 224 may include executable code (e.g., script for API calls), podcasts, links, and the like.

User-associated information 226 may include URLs that are stored by users (e.g., one or more URLs for one or more users). In some examples, user-associated information 226 may further, or in the alternative, include web pages corresponding to the URLS. The URLs may have been stored by a user using techniques described herein.

Social networking subsystem 230 may provide social networking services and related features, which may include login subsystem 232, content feed manager 234; third party integration subsystem 236, and URL archiving subsystem 238. Login subsystem 232 may be for logging a user (e.g., users 112, 122, . . . 132) at a client device (e.g., client devices 110, 120, . . . 130) into SNS 150.

Content feed manager 234 may provide content to be sent to a client device (e.g., client devices 110, 120, . . . 130) for display. Content feed manager 234 may include a content generator subsystem for adding objects (e.g., images, videos, audio files, comments, status messages, links, applications, and/or other entity information, connection information, or content 226) to social networking database 220. Content feed manager 234 may further include a content selector subsystem for choosing the information/content to be sent to clients 110, 120, . . . 130 for display Third party integration subsystem 236 may provide users access to services of third party service providers using an application for a social networking service (e.g., provided by SNS 210). Third party integration subsystem 236 may include a page subsystem for retrieving requested pages associated with third party service providers (e.g., from third party servers). The page subsystem may also inject script into the pages, and/or provide the pages (e.g., to client devices).

Third party integration subsystem 236 may further include application programming interfaces (APIs) for receiving API calls (e.g., from script in a page) to obtain information associated with users (e.g., of the social networking service), and in response, retrieving (e.g., from social networking database 220) and providing (e.g., to client devices) the requested information. Third party integration subsystem 236 may further include an optional page cache for storing pages associated with third party service providers (e.g., obtained from third party servers).

URL archiving subsystem 238 may be used to implement one or more processes described herein. For example, URL archiving subsystem 238 may provide a SAVE button and/or ACCESS button to users of SNS 210. The SAVE button may allow users to store URLs corresponding to web pages when the users are viewing the web pages. The URLs may be stored in association with the users such that the users may access the stored URLs using the ACCESS button. The ACCESS button may identify URLs that are in the same domain as a web page currently being viewed and provide the URLs to the user.

Figure 3A:
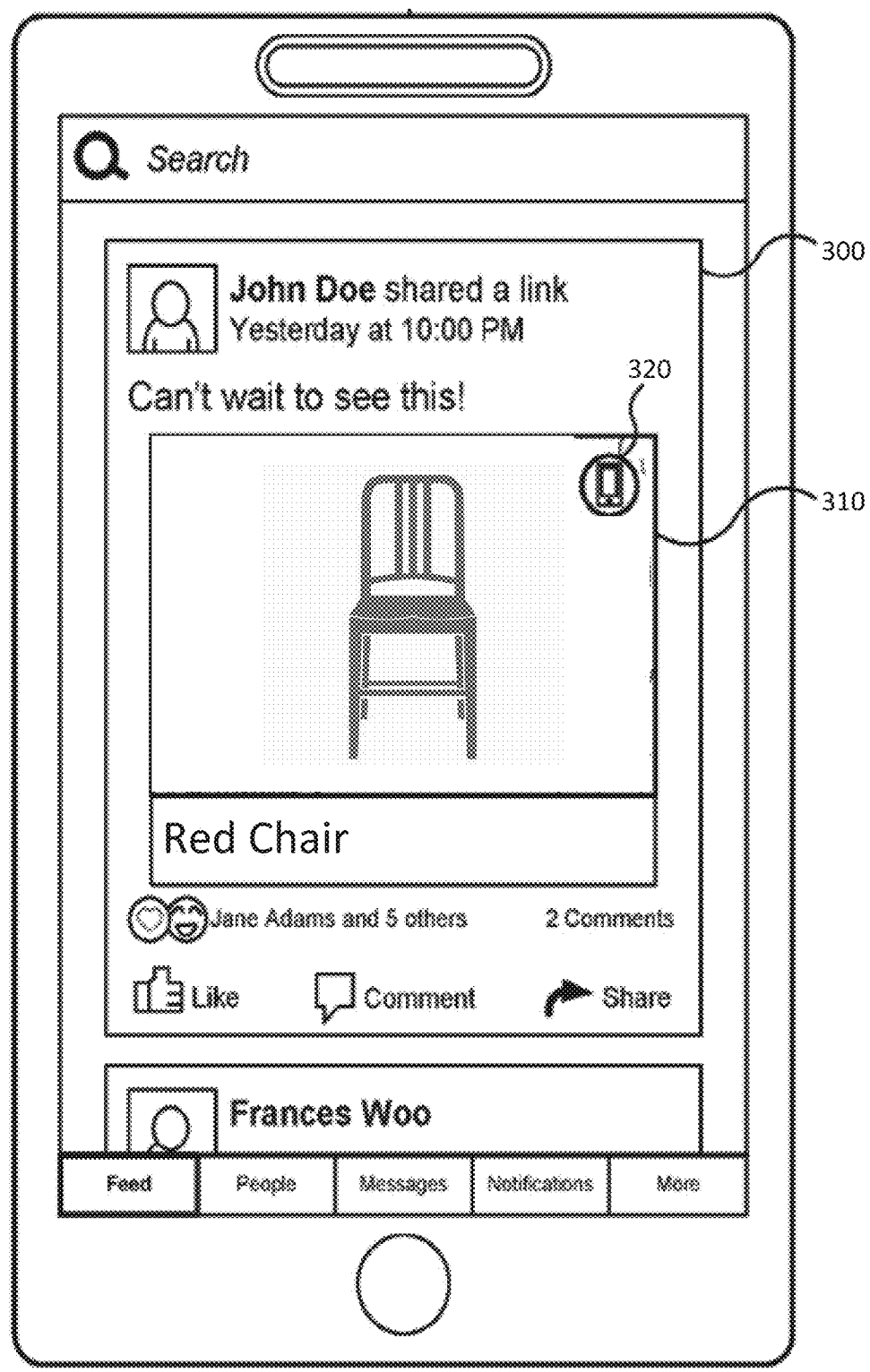
FIG. 3A is an example of a user interface that may be displayed to a user by a social networking application according to certain embodiments.

FIGS. 3A through 3E depict a sequence of web pages showing a method of archiving URLs according to certain embodiments. FIG. 3A is an example of a user interface that may be displayed to a user by a social networking application according to certain embodiments. The user interface may allow a user to view and interact with content of a social networking service (e.g., provided by SNS 150 as illustrated in FIG. 1). For example, the user interface in FIG. 3A displays a feed of social networking content (e.g., text comments, media, etc.) for a particular user of the social networking service.

In some cases, the social networking content includes links to pages associated with third party service providers (e.g., third party servers 160, 170, and 180 as illustrated in FIG. 1). For example, the feed in FIG. 3A includes a post 300 by user "John Doe" sharing link 310. Link 310 may be associated with a web page hosted by a third party system. In some embodiments, indication 320 may be overlaid on link 310 to denote that link 310 is to a web page associated with a third party system, and that selecting link 310 loads the web page within the social networking application. The page thus may be loaded without switching to another application.

Figure 3B:
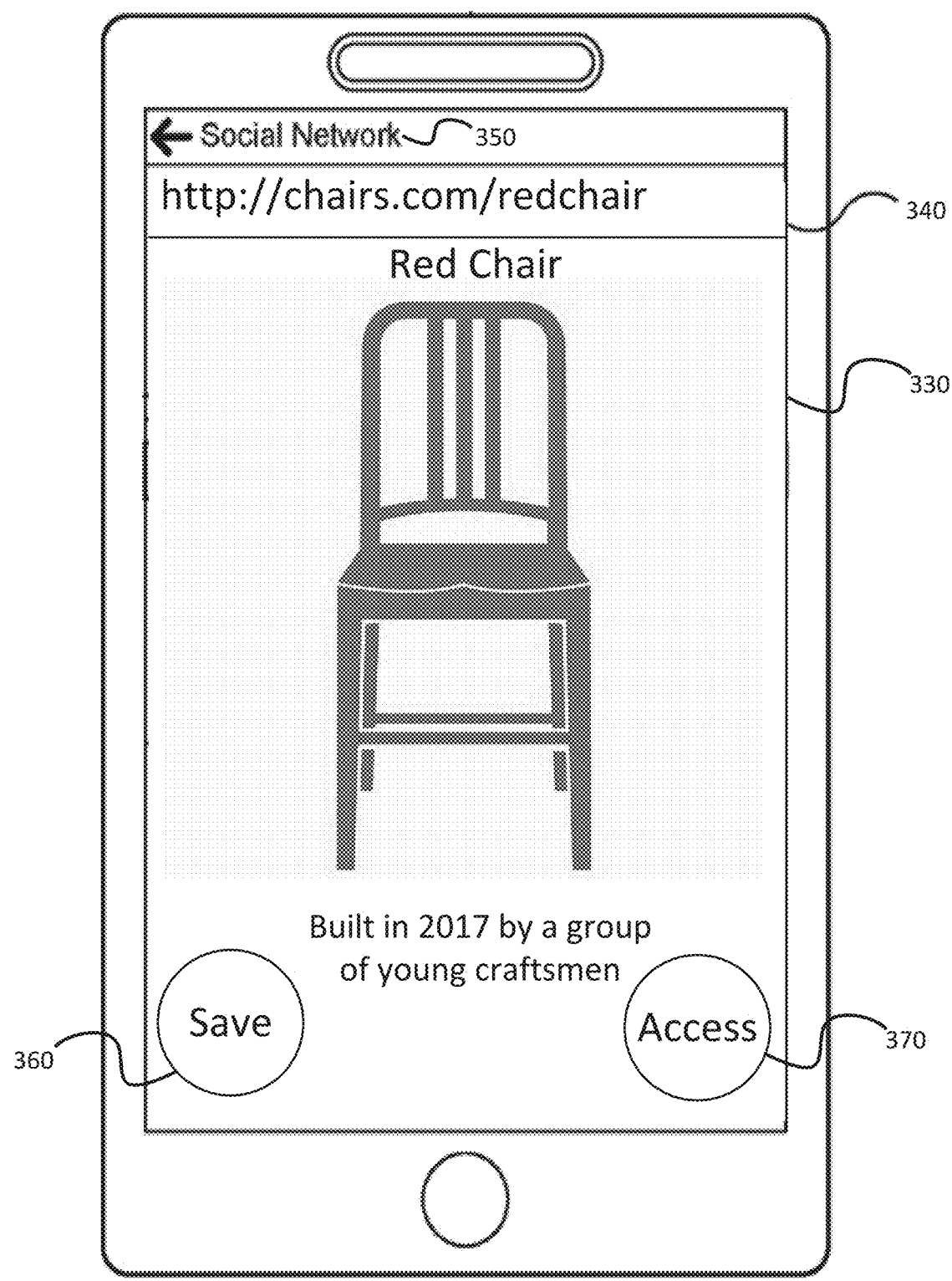
FIG. 3B is an example of a user interface for a web page hosted by a third party system according to certain embodiments.

User selection of link 310 (e.g., with a touch input) may cause the social networking application to load a web page corresponding to the selected link 310. In this example, as illustrated in FIG. 3B, the web page is a web page 330 depicting a gallery of a red chair. Web page 330 is loaded and presented to the user by the social networking application upon the user's selection of link 310.

To present web page 330, an application (e.g., social networking application) may communicate with a system (e.g., a social networking system (SNS)) associated with the social networking application, which in turn may cause the SNS to navigate to URL 340 to obtain the corresponding web page 330. In some examples, the SNS may then obtain web page 330 from the third party system and then send web page 330 to the social networking application to be presented in a user interface of the social networking application. And because the social networking application is providing the user interface, the user interface may further include an option (e.g., button 350) to revert back to content provided by the SNS (e.g., the user interface illustrated in FIG. 3A).

The user interface in FIG. 3B may further include buttons, such as SAVE button 360 and ACCESS button 370, that enable operations to be performed with respect to the URLs corresponding to the web pages being browsed by the user. For example, SAVE button 360 may enable a user to save or archive a URL corresponding to a web page being viewed by the user, such that the user can later access the archived URL. ACCESS button 370 may enable a user to view previously archived URLs and to select a particular previously archived URL in order to be presented with a web page corresponding to that particular URL. Functionality provided by SAVE button 360 and ACCESS button 370 are further described below.

Figure 3C:
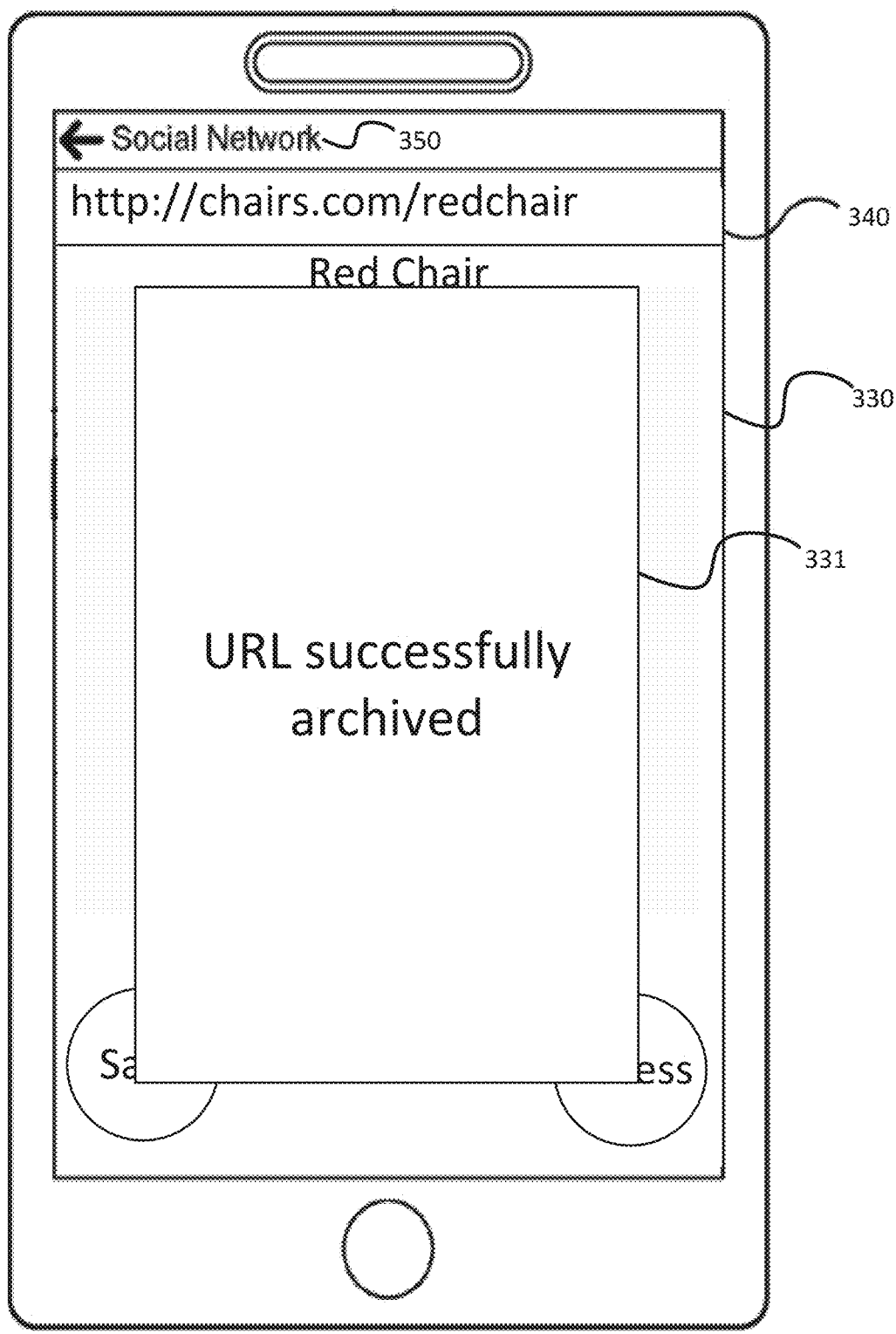
FIG. 3C is an example of a user interface that is displayed after a URL has been successfully archived in response to a user selecting a SAVE button according to certain embodiments.

FIG. 3C is an example of a user interface that is displayed after a URL has been successfully archived in response to a user selecting SAVE button 360 depicted in FIG. 3B according to certain embodiments. The user interface in FIG. 3C may include notification 331, which indicates a status of storing the URL. In the example of FIG. 3C, the storing was a success. In other examples, the storing may fail, be a duplicate, or the like.

Figure 3D:
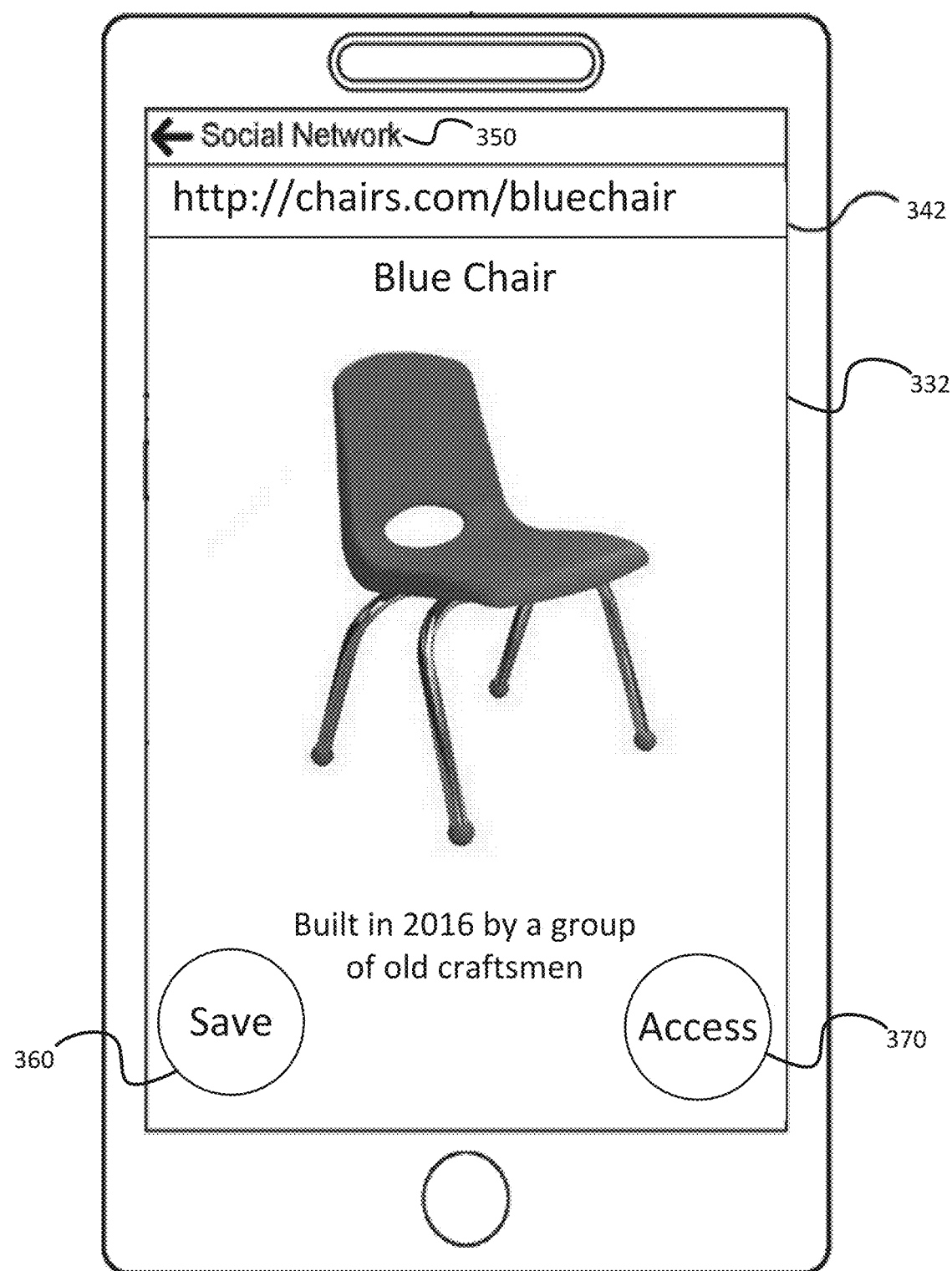
FIG. 3D is another example of a user interface for a web page hosted by a third party system according to certain embodiments.

FIG. 3D is an example of a user interface for web page 332 hosted by a third party system according to certain embodiments. Web page 332 may be hosted by the same third party system that hosted web page 330 in FIG. 3B, and correspond to a Uniform Resource Locator (URL) 342. URL 342 may be different than URL 340 in FIG. 3B. Web page 332 may be presented in response to a user selecting a link corresponding to web page 332 or by navigating from a web page (such as web page 330) to web page 332 using one or more links.

To present web page 332, an application (e.g., social networking application) may cause a system (e.g., a social networking system) to navigate to URL 342. In some examples, the system may then obtain web page 332 from the third party system and then send web page 332 to the application to be presented in a user interface of the application. And similar to FIG. 3B, the user interface in FIG. 3D may further include an option (e.g., button 350) to revert back to content provided by the social networking system (e.g., the user interface illustrated in FIG. 3A).

The user interface in FIG. 3D may further include buttons related to URL archiving as described herein. The buttons may include SAVE button 360 and ACCESS button 370. SAVE button 360 may be used to save a URL corresponding to a web page such that a user may access the web page at a later time. ACCESS button 370 may be used to view URLs corresponding to web pages that were stored by the user, as further described below.

Figure 3E:
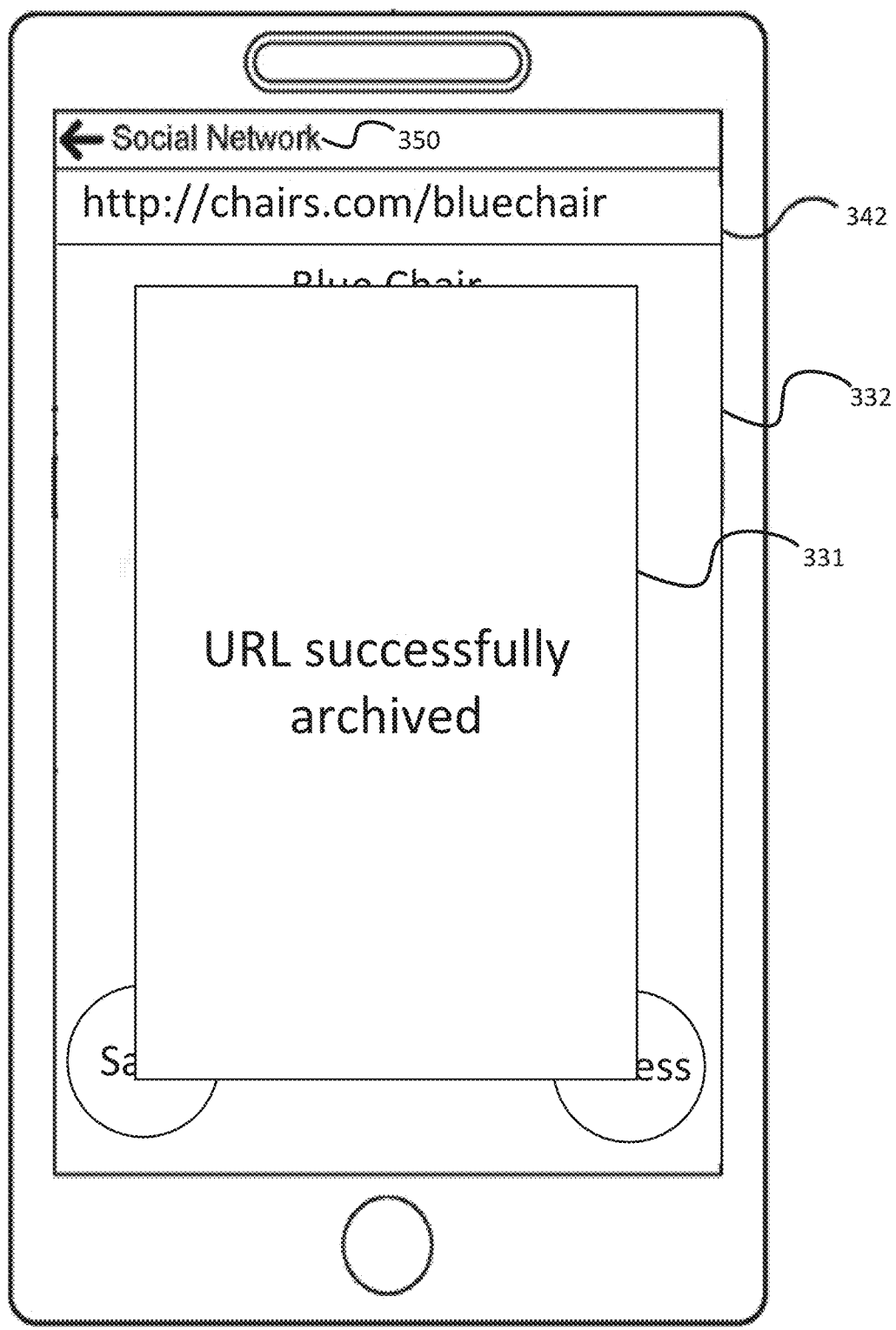
FIG. 3E is another example of a user interface resulting from saving a Uniform Resource Locator (URL) according to certain embodiments.

FIG. 3E is another example of a user interface resulting from saving a Uniform Resource Locator (URL) according to certain embodiments. The saving may result from a user selecting a SAVE button (e.g., SAVE button 360 from FIG. 3D). The user interface in FIG. 3E may include notification 331, which indicates a status of storing the URL. In the example of FIG. 3E, the storing was a success. In other examples, the storing may fail, be a duplicate, or the like.

In the embodiment described above with respect to FIGS. 3A-3E, it was assumed that the user was performing browsing activities using a social networking application in communication with a SNS. This is however not intended to be limiting. The application used by the user to perform the browsing may be any application in communication with a system supporting the application, where the system provider is distinct from providers of third party websites browser by the user.

Figure 4A:
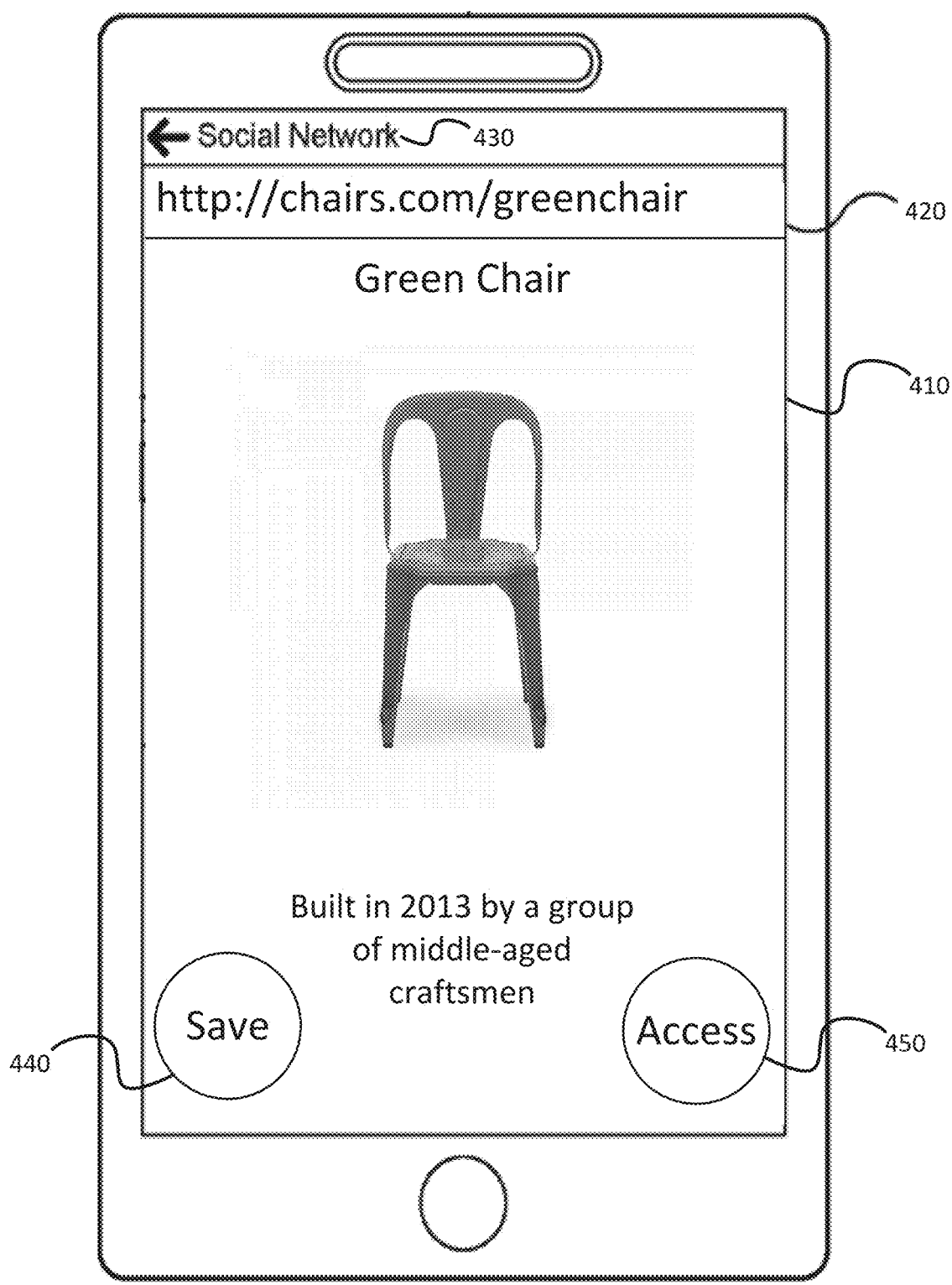
FIG. 4A is another example of a user interface for a web page hosted by a third party system according to certain embodiments.
Figure 4B:
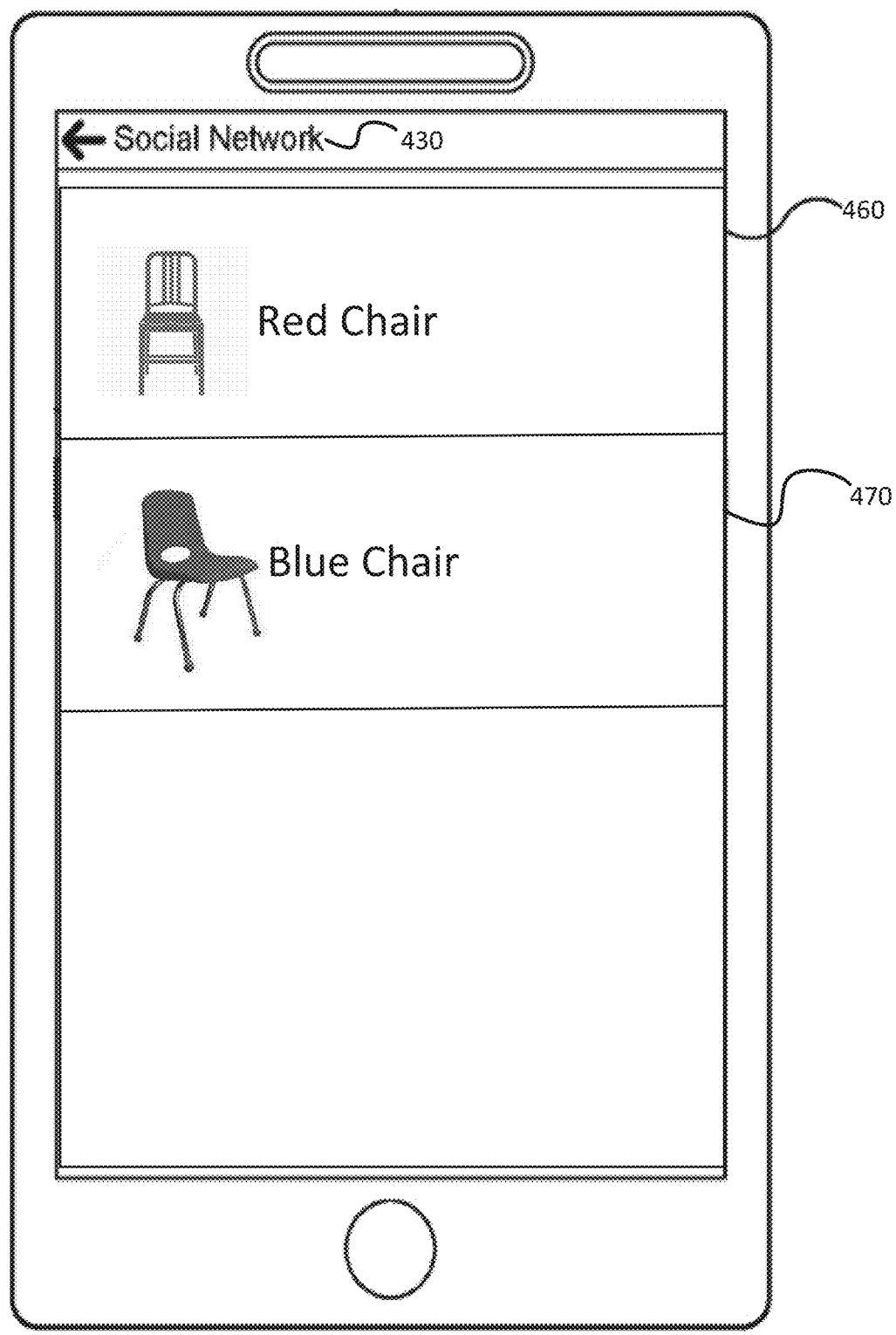
FIG. 4B is an example of a user interface resulting from selecting an ACCESS button according to certain embodiments.
Figure 4C:
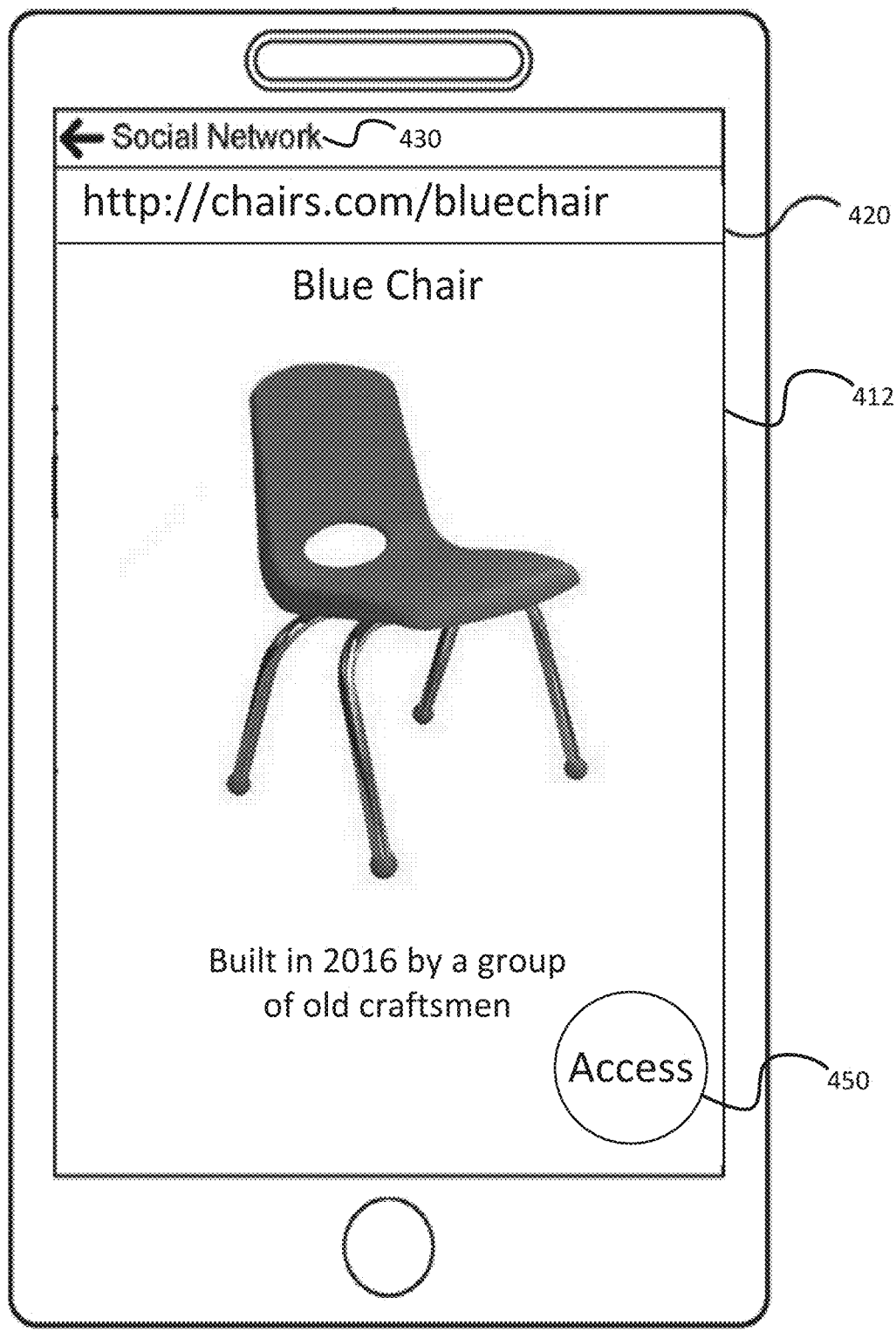
FIG. 4C is an example of a user interface resulting from selecting information associated with a Uniform Resource Locator (URL) according to certain embodiments.

FIGS. 4A through 4C depict a sequence of web pages showing a method of accessing an archived URL according to certain embodiments. FIG. 4A is another example of a user interface for web page 410 according to certain embodiments. Web page 410 may be hosted by the same third party system that hosted web page 330 in FIG. 3B and web page 332 in FIG. 3D, and correspond to a Uniform Resource Locator (URL) 430. URL 430 may be different than URL 340 in FIG. 3B and URL 342 in FIG. 3D. Web page 410 may be presented in response to a user selecting a link corresponding to web page 410 or by navigating from a web page (such as web page 330) to web page 410 using one or more links.

To present web page 410, an application (e.g., social networking application) may cause a system (e.g., a social networking system) to navigate to URL 430. In some examples, the system may then obtain web page 410 from the third party system and then send web page 410 to the application to be presented in a user interface of the application. And similar to FIGS. 3B and 3D, the user interface in FIG. 4A may further include an option (e.g., button 350) to revert back to content provided by the social networking system (e.g., the user interface illustrated in FIG. 3A).

The user interface in FIG. 4 may further include buttons related to URL archiving as described herein. The buttons may include SAVE button 440 and ACCESS button 450. SAVE button 440 may be used to save a URL corresponding to a web page such that a user may access the web page at a later time. ACCESS button 450 may be used to view URLs corresponding to web pages that were stored by the user, as further described below.

FIG. 4B is an example of a user interface resulting from selecting an ACCESS button according to certain embodiments. The ACCESS button may be ACCESS button 450 illustrated in FIG. 4. The user interface may include indications (e.g., buttons) corresponding to URLs stored for a user account. The indications may include first indication 460 and second indication 470. First indication 460 may correspond to the URL stored in FIGS. 3B and 3C. Second indication 470 may correspond to the URL stored in FIGS. 3D and 3E. Each of the indications in FIG. 4B may correspond to a URL with a particular domain (i.e., the domain associated with first indication 460 may be the same domain that is associated with second indication 470). Each of the indications may also have the same domain as a web page currently being viewed by a user device that had the ACCESS button selected. In response to selection an indication, the user interface may present a selected web page, as described below for FIG. 4C.

FIG. 4C is an example of a user interface resulting from selecting information associated with a Uniform Resource Locator (URL) according to certain embodiments. The user interface may be presenting web page 412 (which may have the same URL as web page 332 in FIG. 3D). In some examples, web page 412 may be the same web page as web page 332. In such examples, web page 332 may be stored by a social networking system such that web page 332 may be provided at a later time. In other examples, web page 412 may be a different web page as web page 332. In such examples, a system managing a URL corresponding to web page 332 may change a web page resulting from navigating to the URL. Accordingly, when the URL is navigated to to obtain web page 412, a current web page corresponding to the URL may be retrieved (which may be the same or different web page as web page 332. The user interface of FIG. 4C may be presented in response to indication 470 being selected from FIG. 4B.

Web page 412 may be associated with Uniform Resource Locator (URL) 970. While web page 412 may be hosted by a third party system, a social networking system may be used to present web page 412. For example, a social networking application may be used to navigate to web page 412. As such, the social networking application may act as a browser for web page 412. In some examples, only ACCESS button 450 would be shown because the web page being presented has already been stored. The user interface in FIG. 4C further includes option 930, indicating that a user may cause the user interface to switch back to content from the social networking system (e.g., as depicted in FIG. 3A).

Figure 5:
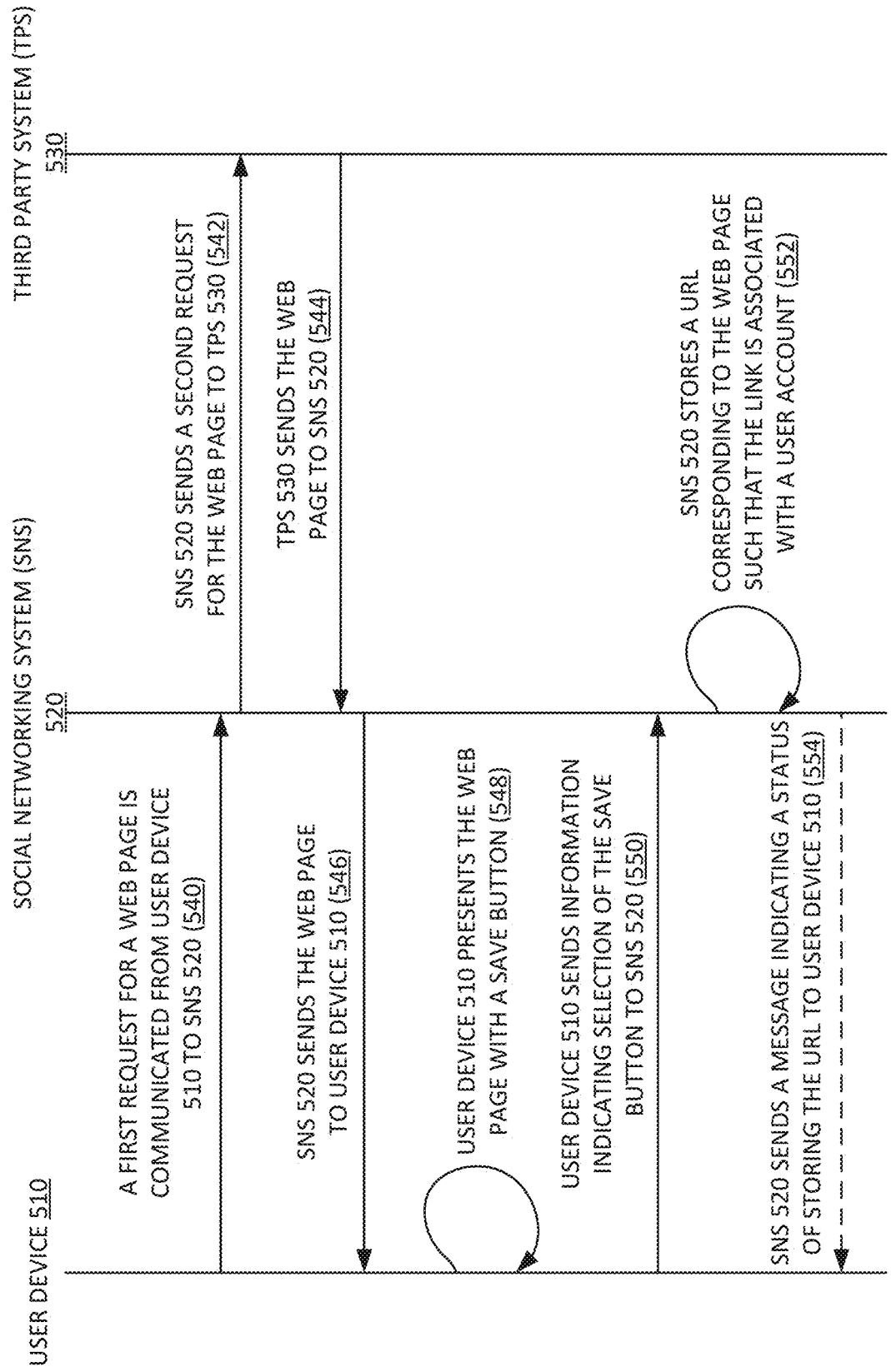
FIG. 5 is a simplified flowchart depicting processing performed in a distributed environment where functionality for archiving URLs is implemented by a social networking system (SNS) according to certain embodiments.

FIG. 5 is a simplified flowchart depicting processing performed in a distributed environment where functionality for archiving URLs is implemented by a social networking system (SNS) according to certain embodiments. While FIG. 5 refers to a SNS, this is not intended to be limiting. It should be recognized that SNS 520 may represent any computing system that enables users to browse and access web pages hosted by third party websites and not by the computing system. While the distributed environment depicted in FIG. 5 includes user device 510, SNS 520, and third party system (TPS) 530, it should be recognized that this again is not intended to be limiting. The teachings described herein may be practiced in other distributed systems that may include more user devices and/or more third party systems or other types of systems.

The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel.

In the embodiment depicted in FIG. 5, the processing may be triggered at 540 when a request for a web page (a first request) is communicated from user device 510 to SNS 520. For example, the first request may be triggered by an application (e.g., a social networking application) executing on user device 510 when a user requests for the web page via the application. For example, the user may request the webpage by providing (e.g., typing in) a URL corresponding to the web page, by selecting a link (or other content displayed by the application on user device 510) corresponding to the web page, and the like.

SNS 520 may receive the first request because it is associated with the application generating the first request. For example, the first request may be generated by a social networking application that is facilitated by SNS 520.

Upon receiving the first request, SNS 520 may determine that the requested web page is hosted by a third party website hosted by a third party system (TPS) 530. In some examples, the first request may include a Uniform Resource Locator (URL) for the requested web page or other information that enables SNS 520 to obtain the requested web page from TPS 530 (e.g., information that can be used by SNS 520 to determine a URL for the requested web page).

At 542, SNS 520 may send a request for the web page (second request) to TPS 530 for the requested web page. The second request may include the URL corresponding to the requested web page.

At 544, upon receiving the second request from SNS 520, TPS 530 may determine the web page corresponding to the request (e.g., corresponding to the URL in the second request) and communicate that web page to SNS 520 in response to the second request. At 546, SNS 520 may communicate the web page received from TPS 530 to user device 510. The web page may be sent to user device 510 as a response to the first request.

In some examples, SNS 520 may modify the web page received from TPS 530 in 544 and then send the modified web page to user device 510 in 546. For example, SNS 520 may add code or computer-executable instructions to the web page that add URL archiving functionality to the web page. For example, code may be added to the web page received from TPS 530 that implements a SAVE button for archiving URLs, such as SAVE button 360 depicted in FIG. 3B. For example, SNS 530 may insert Hypertext Markup Language (HTML) into the web page that implements the SAVE button.

In some other examples, instead of modifying the web page to implement the SAVE button functionality, SNS 520 may send information or content to user device 510 along with the web page received from TPS 530 that enables the application executing on user device 510 to display a SAVE button when the requested web page is displayed by the application on user device 510.

At 548, user device 510 presents the web page along with a SAVE button. For example, the application (e.g., a social networking application) on user device 510 that initiated the first request may display the requested web page to the user of user device 510.

As described above, in certain embodiments, the web page received by user device 510 may include code (e.g., inserted by SNS 520) that causes the SAVE button to be presented along with the web page. In other examples, the application may cause the SAVE button to be presented with the web page based upon information received from SNS 520 along with the web page. For example, the application may include the HTML that implements the SAVE button. In such an example, the application may cause the HTML to be executed and the SAVE button to be presented with the web page.

The user viewing the requested web page may decide that the URL corresponding to the web page being viewed is to be archived for later access. In such a scenario, the user may select (e.g., click) the SAVE button. In response, at 550, user device 510 sends information to SNS 520 indicating selection of the SAVE button. In some examples, the information sent to SNS 530 in 550 may further include information identifying the URL corresponding to the web page being currently presented to the user by user device 510 when the SAVE button was selected by the user, and for which the URL is to be stored or archived. In other examples, the SNS 520 may keep a record of the URL of the last web page sent to the user device in 546 and being presented to the user by user device 510 when the user selects the SAVE button.

At 552, SNS 520 stores a Uniform Resource Locator (URL) corresponding to the web page presented to the user on the user device when the user selected the SAVE button. The URL is stored such that the URL is associated with a user account corresponding to user selecting the SAVE button. In some examples, upon receiving the save request in 520, as part of 552, SNS 520 first determines the user for which the URL is to be stored. For example, the user may be determined based upon an Internet Protocol (IP) address of the user device. For another example, the user may be determined based upon user information for a session. For illustrative purposes, the user account may be associated with SNS 520. For example, the application executing on user device 510 may be logged into the user account in order to be able to use one or more services of SNS 520.

While not required, at 554, SNS 520 may send a message to user device 510 indicating a status of the URL store operation performed by SNS 520. For example, the message may indicate that the storage operation was either a success (as depicted in the example shown in FIG. 3C) or a failure. In response to receiving the message, user device 510 may present a notification indicating the status of the storage operation.

Figure 6:
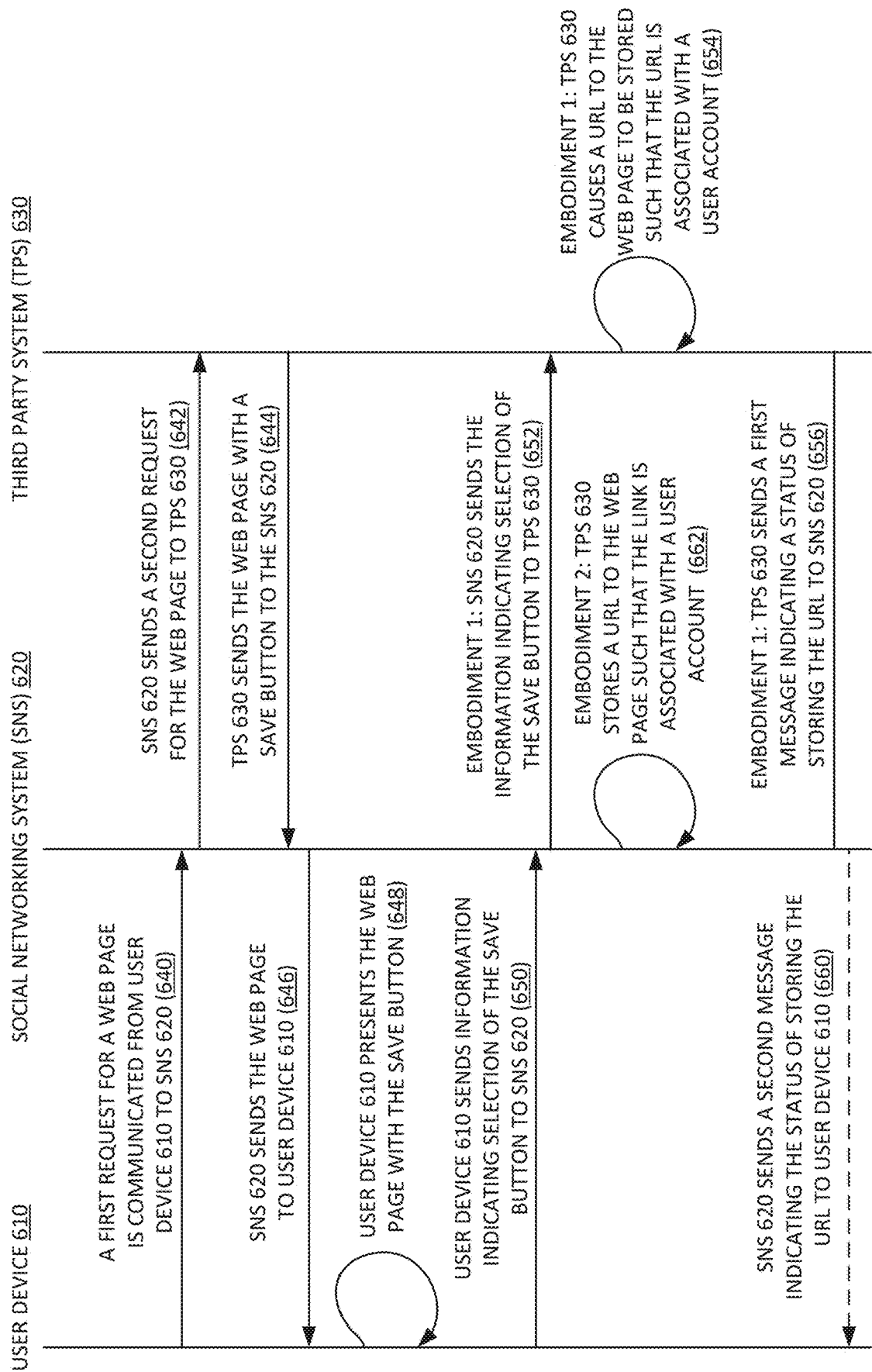
FIG. 6 is a simplified flowchart depicting processing performed in a distributed environment when a SAVE button is implemented by a third party system according to certain embodiments.

FIG. 6 is a simplified flowchart depicting processing performed in a distributed environment when a SAVE button is implemented by a third party system (TPS) according to certain embodiments. While FIG. 6 refers to a SNS, this is not intended to be limiting. It should be recognized that SNS 620 may represent any computing system that enables users to browse and access web pages hosted by third party websites and not by the computing system. While the distributed environment depicted in FIG. 6 includes user device 610, SNS 620, and third party system (TPS) 630, it should be recognized that this again is not intended to be limiting. The teachings described herein may be practiced in other distributed systems that may include more user devices and/or more third party systems or other types of systems.

The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order or some steps may also be performed in parallel.

In the embodiment depicted in FIG. 6, the processing may be triggered at 640 when a request for a web page (a first request) is communicated from user device 610 to SNS 620. For example, the first request may be triggered by an application (e.g., a social networking application) executing on user device 610 when a user requests for the web page via the application. For example, the user may request the webpage by providing (e.g., typing in) a URL corresponding to the web page, by selecting a link (or other content displayed by the application on user device 610) corresponding to the web page, and the like.

SNS 620 may receive the first request because it is associated with the application generating the first request. For example, the first request may be generated by a social networking application that is facilitated by SNS 620.

Upon receiving the first request, SNS 620 may determine that the requested web page is hosted by a third party website hosted by a third party system (TPS) 630. In some examples, the first request may include a Uniform Resource Locator (URL) for the requested web page or other information that enables SNS 620 to obtain the requested web page from TPS 630 (e.g., information that can be used by SNS 620 to determine a URL for the requested web page).

At 642, SNS 620 may send a request for the web page (second request) to TPS 630 for the requested web page. The second request may include the URL corresponding to the requested web page.

At 644, upon receiving the second request from SNS 620, TPS 630 may determine the web page corresponding to the request (e.g., corresponding to the URL in the second request) and communicate that web page to SNS 620 in response to the second request. In other examples, the web page may be sent directly to user device 610, and not go through SNS 620. The web page, when sent from TPS 630, may include a SAVE button that facilitates a SAVE mechanism as described further below. At 646, SNS 620 may communicate the web page received from TPS 630 to user device 610. The web page may be sent to user device 610 as a response to the first request.

At 648, user device 610 presents the web page with the SAVE button. In some examples, the SAVE button may be implemented by TPS 630 (i.e., TPS 630 may insert the SAVE button into the web page).

The user viewing the requested web page may decide that the URL corresponding to the web page being viewed is to be archived for later access. In such a scenario, the user may select (e.g., click) the SAVE button. In response, at 650, user device 610 sends information to SNS 620 indicating selection of the SAVE button. In some examples, the information sent to SNS 630 in 650 may further include information identifying the URL corresponding to the web page being currently presented to the user by user device 610 when the SAVE button was selected by the user, and for which the URL is to be stored or archived. In other examples, the SNS 620 may keep a record of the URL of the last web page sent to the user device in 646 and being presented to the user by user device 610 when the user selects the SAVE button. In some examples, the information may be sent directly to TPS 630, and not go through SNS 620.

After the information is received by SNS 620, one of two embodiments (i.e., embodiment 1 and embodiment 2) may be used. Embodiment 1 (which includes 652, 554, and 656) may be used when TPS 630 manages save operations. Embodiment 2 (which includes 662) may be used when SNS 620 manages save operations.

For embodiment 1, at 652, SNS 620 sends the information to TPS 630. In this path, SNS 620 does not need to understand the information. Instead, the SNS 620 merely needs to forward the information received from user device 610 to TPS 630.

At 654, TPS 630 causes a Uniform Resource Locator (URL) corresponding to the web page to be stored such that the URL is associated with a user account managed by SNS 620. For example, TPS 630 may send a communication to SNS 620. The communication may cause SNS 620 to store the URL with a user account associated with user device 610.

In some examples, TPS 630 may need to identify the user account when sending the communication. In such examples, the information received by TPS 630 may include an identification of the user account. In other examples, TPS 630 may obtain the identification of the user account from SNS 620. For example, an earlier message from SNS 620 to TPS 630 may identify the user account. For another example, TPS 630 may request an identification of the user account in response to receiving the information from SNS 620.

In other examples, TPS 630 may store the URL with a user account such that the URL is associated with the user account. In such examples, the user account may be managed by TPS 630.

At 656, TPS 630 may send a first message to SNS 620. The first message may indicate a status of storing the URL (success or failure).

For embodiment 2, at 662, SNS 620 may parse the information received from user device 610. In this path, SNS 620 does not need to send the information to TPS 630. After parsing the information, SNS 620 may store the URL such that the URL is associated with a user account stored by SNS 630. The user account may be a user account of multiple user accounts maintained by SNS 620.

While not required, at 660, SNS 620 may send a message (second message) to user device 610 indicating a status of the URL store operation. For example, the second message may indicate that the storage operation was either a success (as depicted in the example shown in FIG. 3C) or a failure. In response to receiving the message, user device 610 may present a notification indicating the status of the storage operation.

Figure 7:
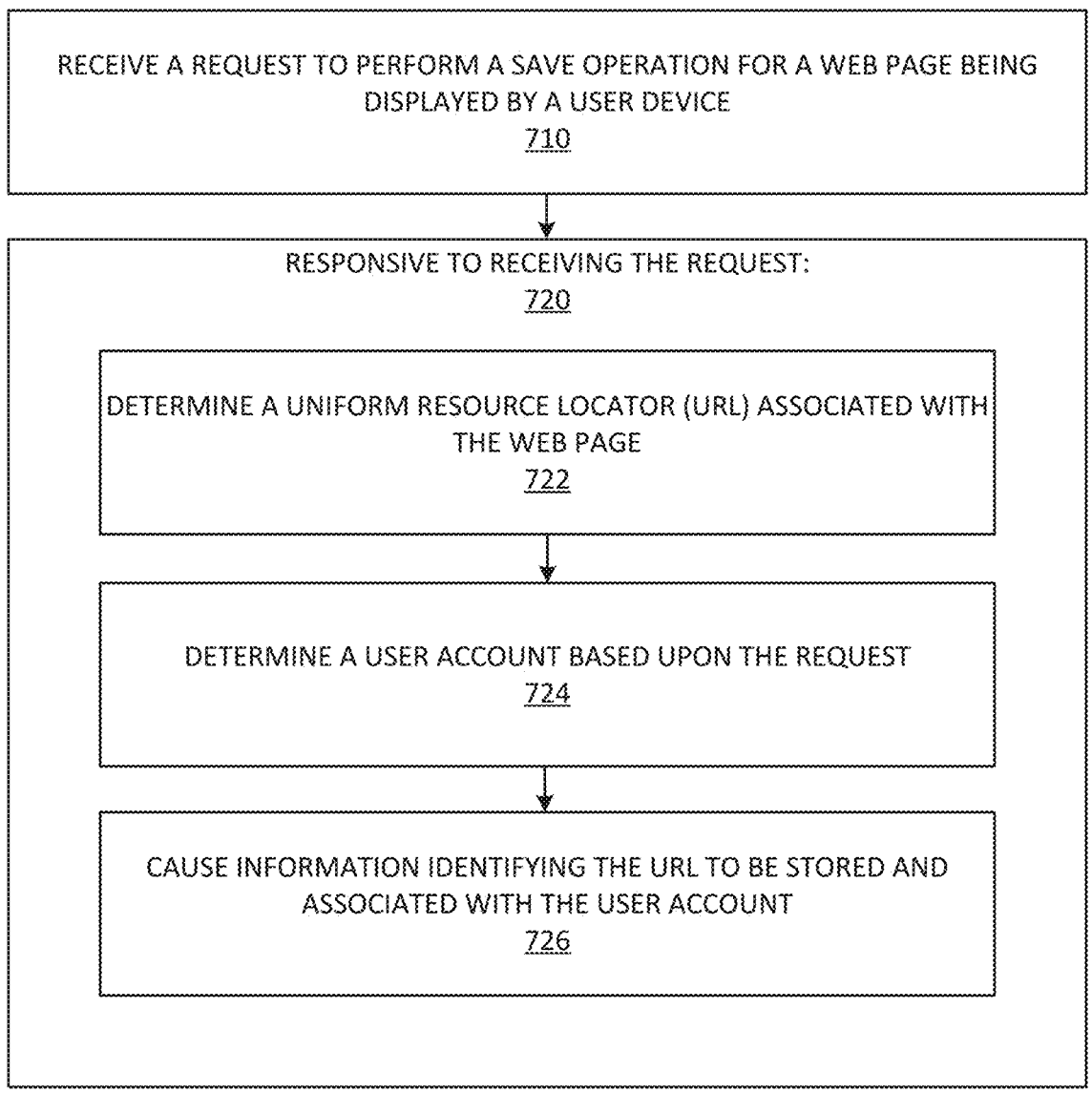
FIG. 7 is a simplified flowchart depicting processing performed to store a Uniform Resource Locator (URL) corresponding to a web page according to certain embodiments.

FIG. 7 is a simplified flowchart depicting processing performed to store a URL corresponding to a web page according to certain embodiments. The processing depicted in FIG. 7 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 7 and described below is intended to be illustrative and non-limiting. Although FIG. 7 depicts the various processing steps occurring in a particular sequence or order, this is not intended to be limiting. In certain alternative embodiments, the steps may be performed in some different order or some steps may also be performed in parallel.

In the embodiment depicted in FIG. 7, the processing may be triggered at 710 when a request is received to perform a save operation for a web page being displayed by a user device. In some examples, prior to receiving the request, the first system may receive information identifying a Uniform Resource Locator (URL) corresponding to the web page. In such examples, the first system may obtain the web page from the second system and communicate the web page to the user device. The first system may also cause a first user-selectable option (e.g., a button) to be displayed by the user device when the web page is displayed by the user device. The request may then be received upon selection of the first user-selectable option by a user of the user device.

At 720, a number of steps may be performed in response to receiving the request. For example, steps 722, 724, and 726 (as described below) may be performed.

At 722, a Uniform Resource Locator (URL) corresponding to the web page may be determined. At 724, a user account may be determined based upon the request. In some examples the user account may be associated with a social networking system. In other examples, the user account may be associated with some other system (e.g., a third party system). At 726, information identifying the URL may be stored and associated with the user account.

In some examples, the processing depicted in FIG. 7 may further include sending a message to the user device indicating successful completion of the save operation. The message may be sent in response to the information being caused to be stored and associated with the user account.

While the above description has been related to save operations, this disclosure also is related to accessing web pages that have been stored. For example, the processing depicted in FIG. 7 may further include receiving information indicating selection of a second user-selectable option (e.g., an ACCESS button) displayed by the user device. The information may be received at the first system from the user device.

Responsive to receiving the information indicating selection of the second user-selectable option, a current URL may be determined. The current URL may be associated with a web page being displayed by the user device when the second user-selectable option was selected. A domain for the current URL may be identified.

Based upon the domain, one or more URLs may be identified. The one or more URLs may be stored for and associated with the user account, where each URL in the one or more URLs is associated with the domain. Information identifying the one or more URLs may be communicated from the first system to the user device. Information indicating selection of a particular URL from the one or more URLs may be received by the first system from the user device.

In response to receiving the information, a particular web page corresponding to the particular URL may be communicated from the first system to the user device. Further discussion of the ACCESS button is described below.

Figure 8:
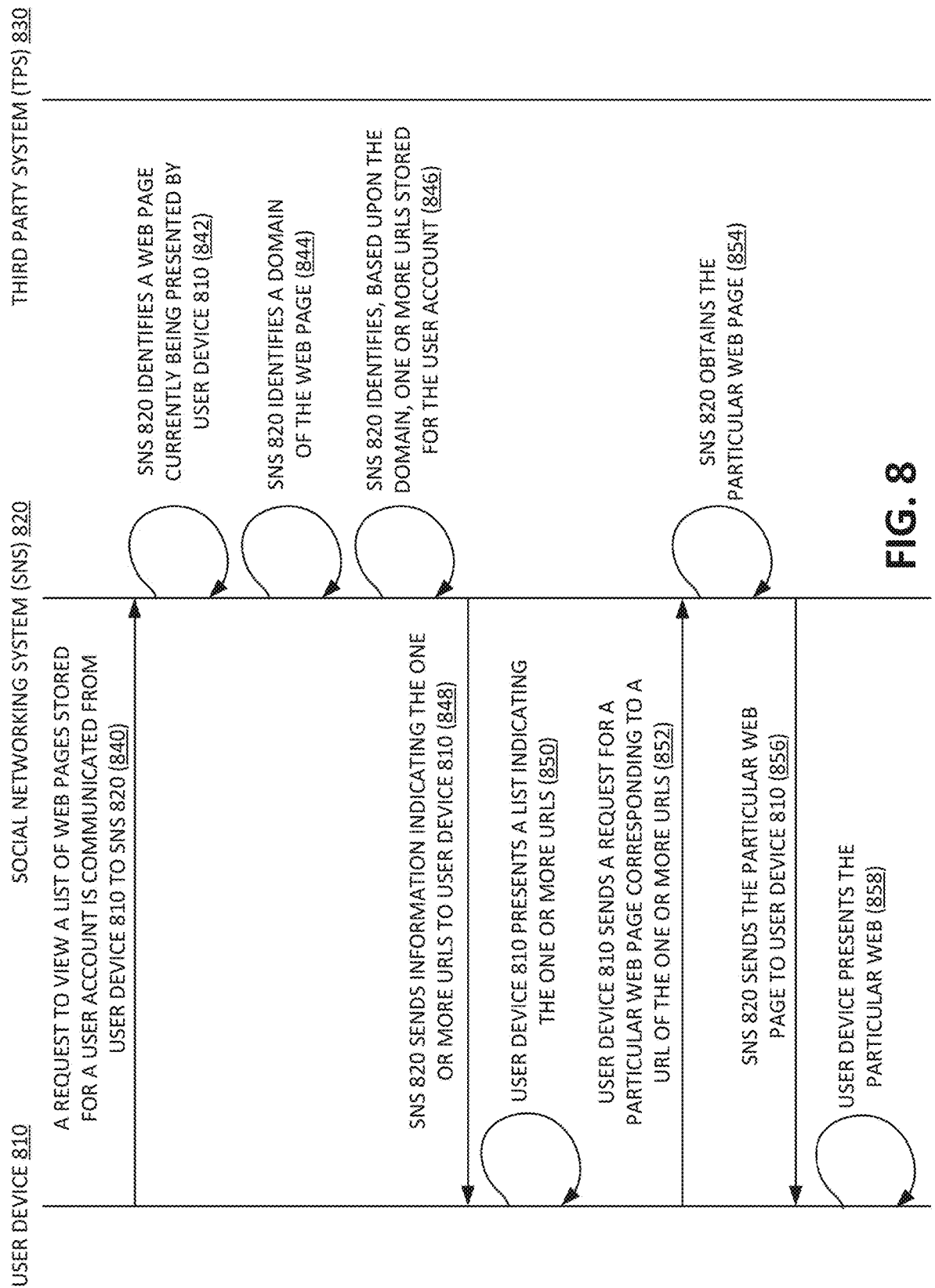
FIG. 8 is a simplified flowchart depicting processing performed related to an ACCESS button in a distributed environment according to certain embodiments.

FIG. 8 is a simplified flowchart depicting processing performed related to an ACCESS button in a distributed environment according to certain embodiments. While FIG. 8 refers to a SNS, this is not intended to be limiting. It should be recognized that SNS 820 may represent any computing system that enables users to browse and access web pages hosted by third party websites and not by the computing system. While the distributed environment depicted in FIG. 8 includes user device 810, SNS 820, and third party system (TPS) 830, it should be recognized that this again is not intended to be limiting. The teachings described herein may be practiced in other distributed systems that may include more user devices and/or more third party systems or other types of systems.

The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 8 and described below is intended to be illustrative and non-limiting. The particular series of processing steps depicted in FIG. 8 is not intended to be limiting. Although FIG. 8 depicts the various processing steps occurring in a particular sequence or order, this is not intended to be limiting. In certain alternative embodiments, the steps may be performed in some different order or some steps may also be performed in parallel.

In the embodiment depicted in FIG. 8, the processing may be triggered at 840 when a request to view a list of web pages stored for a user account is communicated from user device 810 to SNS 820. The request may be sent by an application (e.g., a social networking application) in response to a user selecting a user-selectable option. The application may be executing on user device 810. The application may be associated with SNS 820.

At 842, SNS 820 may identify a web page currently being presented by user device 810. In some examples, the web page may be identified by a Uniform Resource Locator (URL). At 844, SNS 820 may identify a domain of the web page. When the web page is identified by a URL, the URL may be in a format such that the domain of the web page may be readily identified. For example, a URL of www.example.com/helloworld has a domain of example.com.

At 846, SNS 820 may identify, based upon the domain, one or more URLs stored for the user account. For example, the user account may be associated with multiple URLs that were stored based upon techniques described above. The multiple URLs may be filtered based upon which URLs have the same domain as the web page currently being presented by user device 810.

When the ACCESS button is implemented by SNS 830, at 848, SNS 820 sends information indicating the one or more URLs to user device 810. At 850, user device 810 may present a list indicating the one or more URLs. At 852, user device 810 may send a request to SNS 820. The request may be for a particular web page corresponding to a URL of the one or more URLs. The URL of the one or more URLs may be based upon a selection by a user from the presented list.

At 854, SNS 820 may obtain the particular web page. For example, if SNS 820 stores the particular web page, SNS 820 may retrieve the particular web page from a location where SNS 820 stored the particular web page. For another example, when the particular web page is hosted by TPS 830, SNS 820 may send a request for the particular web page to TPS 830 using the URL of the one or more URLs. TPS 830 may then send a response to SNS 820 with the particular web page.

At 854, SNS 820 may send the particular web page to user device 810. In response to receiving the particular web page, at 858, user device 810 may present the particular web page.

While the above discussion relates to when SNS 820 manages access operations, it should be recognized that TPS 830 may manage access operations. When TPS 830 manages access operations, TPS 830 may receive the request at 840. In response to TPS 830 receiving the request, TPS 830 may identify a user account associated with user device 810 by sending a request to SNS 820. The request may be sent at the beginning of an interaction with user device 810 or after the request is received at 840. In other examples, the request at 840 may include an identification of the user account. After the identity is obtained and the request at 840 is received, TPS 830 may send a URL corresponding to a current web page to SNS 820 with the identity so that SNS 820 may perform 844 and 846.

Figure 9:
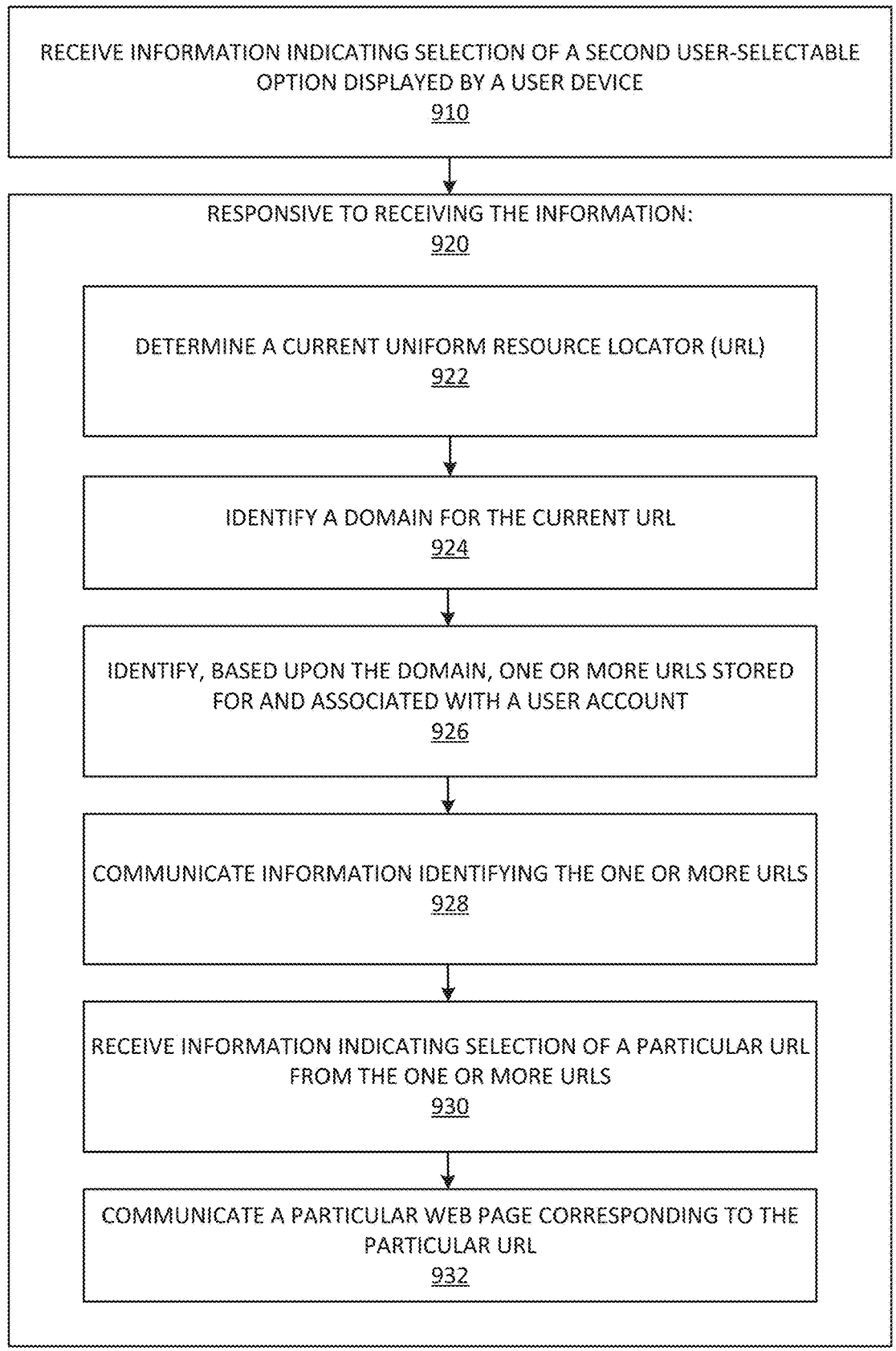
FIG. 9 is a simplified flowchart depicting processing performed to access web pages corresponding to URLs stored by a user according to certain embodiments.

FIG. 9 is a simplified flowchart depicting processing performed to access web pages stored by a user according to certain embodiments. The processing depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 9 and described below is intended to be illustrative and non-limiting. Although FIG. 9 depicts the various processing steps occurring in a particular sequence or order, this is not intended to be limiting. In certain alternative embodiments, the steps may be performed in some different order or some steps may also be performed in parallel.

In the embodiment depicted in FIG. 9, the processing may be triggered at 910 when information is received indicating selection of a second user-selectable option (e.g., a button) displayed by a user device.

At 920, a number of steps may be performed in response to receiving the information. For example, steps 922, 924, 926, 928, 930, and 932 (as described below) may be performed. At 922, a current Uniform Resource Locator (URL) may be determined. The current URL may be associated with a web page being displayed by the user device when the second user-selectable option was selected. In some examples, the current URL may be included in the information.

At 924, a domain for the current URL may be identified. For example, a first portion of the current URL may indicate the domain. In such an example, the first portion may be extracted.

At 926, one or more URLs may be identified based upon the domain. The one or more URLs may be stored for and associated with a user account, where the user account is associated with a social networking system. In some examples, each URL in the one or more URLs is associated with the domain. At 928, information identifying the one or more URLs may be communicated from the first system to the user device.

At 930, information indicating selection of a particular URL from the one or more URLs may be received by the first system from the user device. At 932, a particular web page corresponding to the particular URL may be communicated from the first system to the user device. In some examples the particular web page corresponding to the particular URL may be obtained from a web site storing the particular web page.

Figure 10:
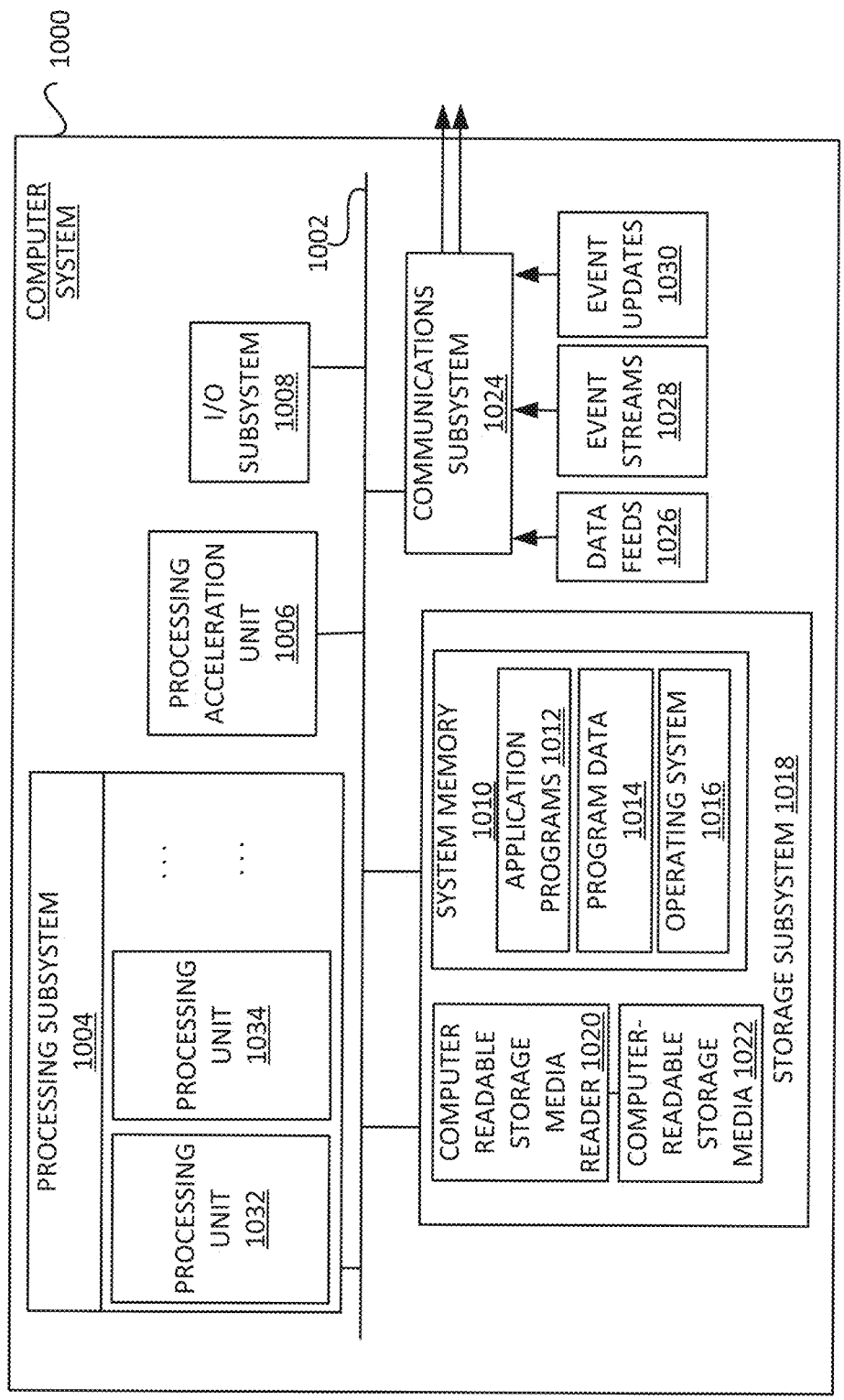
FIG. 10 is a simplified block diagram of a computer system that may be used to implement certain embodiments described herein.

FIG. 10 illustrates an example of computer system 1000, which may be used to implement certain embodiments described herein. For example, in some embodiments, computer system 1000 may be used to implement any of the systems, servers, devices, or the like described above. As shown in FIG. 10, computer system 1000 includes processing subsystem 1004, which communicates with a number of other subsystems via bus subsystem 1002. These other subsystems may include processing acceleration unit 1006, I/O subsystem 1008, storage subsystem 1018, and communications subsystem 1024. Storage subsystem 1018 may include non-transitory computer-readable storage media including storage media 1022 and system memory 1010.

Bus subsystem 1002 provides a mechanism for allowing the various components and subsystems of computer system 1000 to communicate with each other. Although bus subsystem 1002 is shown schematically as a single bus, alternative embodiments of bus subsystem 1002 may utilize multiple buses. Bus subsystem 1002 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1004 controls the operation of computer system 1000 and may comprise one or more processors, application specific integrated circuits (ASICs), or field programmable gate arrays (FPGAs). The processors may include single core and/or multicore processors. The processing resources of computer system 1000 may be organized into one or more processing units 1032, 1034, etc. A processing unit may include one or more processors, one or more cores from the same or different processors, a combination of cores and processors, or other combinations of cores and processors. In some embodiments, processing subsystem 1004 may include one or more special purpose co-processors such as graphics processors, digital signal processors (DSPs), or the like. In some embodiments, some or all of the processing units of processing subsystem 1004 may be implemented using customized circuits, such as application specific integrated circuits (ASICs), or field programmable gate arrays (FPGAs).

In some embodiments, the processing units in processing subsystem 1004 may execute instructions stored in system memory 1010 or on computer readable storage media 1022. In various embodiments, the processing units may execute a variety of programs or code instructions and may maintain multiple concurrently executing programs or processes. At any given time, some or all of the program code to be executed may be resident in system memory 1010 and/or on computer-readable storage media 1022 including potentially on one or more storage devices. Through suitable programming, processing subsystem 1004 may provide various functionalities described above. In instances where computer system 1000 is executing one or more virtual machines, one or more processing units may be allocated to each virtual machine.

In certain embodiments, processing acceleration unit 1006 may optionally be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term input device is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices that enable users to control and interact with an input device and/or devices that provide an interface for receiving input using gestures and spoken commands. User interface input devices may also include eye gesture recognition devices that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1000 to a user or other computer system. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information and data that is used by computer system 1000. Storage subsystem 1018 provides a tangible non-transitory computer-readable storage medium for storing the basic programming and data constructs that provide the functionality of some embodiments. Storage subsystem 1018 may store software (e.g., programs, code modules, instructions) that, when executed by processing subsystem 1004, provides the functionality described above. The software may be executed by one or more processing units of processing subsystem 1004. Storage subsystem 1018 may also provide a repository for storing data used in accordance with the teachings of this disclosure.

Storage subsystem 1018 may include one or more non-transitory memory devices, including volatile and non-volatile memory devices. As shown in FIG. 10, storage subsystem 1018 includes system memory 1010 and computer-readable storage media 1022. System memory 1010 may include a number of memories, including (1) a volatile main random access memory (RAM) for storage of instructions and data during program execution and (2) a non-volatile read only memory (ROM) or flash memory in which fixed instructions are stored. In some implementations, a basic input/output system (BIOS), including the basic routines that help to transfer information between elements within computer system 1000, such as during start-up, may typically be stored in the ROM. The RAM typically includes data and/or program modules that are presently being operated and executed by processing subsystem 1004. In some implementations, system memory 1010 may include multiple different types of memory, such as static random access memory (SRAM), dynamic random access memory (DRAM), and the like.

By way of example, and not limitation, as depicted in FIG. 10, system memory 1010 may load application programs 1012 that are being executed, which may include various applications such as Web browsers, mid-tier applications, relational database management systems (RDBMS), etc., program data 1014, and operating system 1016.

Computer-readable storage media 1022 may store programming and data constructs that provide the functionality of some embodiments. Computer-readable media 1022 may provide storage of computer-readable instructions, data structures, program modules, and other data for computer system 1000. Software (programs, code modules, instructions) that, when executed by processing subsystem 1004 provides the functionality described above, may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1018 may also include computer-readable storage media reader 1020 that may further be connected to computer-readable storage media 1022. Reader 1020 may receive and be configured to read data from a memory device such as a disk, a flash drive, etc.

In certain embodiments, computer system 1000 may support virtualization technologies, including but not limited to virtualization of processing and memory resources. For example, computer system 1000 may provide support for executing one or more virtual machines. In certain embodiments, computer system 1000 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1000. Accordingly, multiple operating systems may potentially be run concurrently by computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments, communications subsystem 1024 may provide wired network connectivity (e.g., Ethernet) in addition to or instead of a wireless interface.

Communication subsystem 1024 may receive and transmit data in various forms. For example, in some embodiments, in addition to other forms, communications subsystem 1024 may receive input communications in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as web feeds and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to communicate data from computer system 1000 to other computer systems or networks. The data may be communicated in various different forms such as structured and/or unstructured data feeds 1026, event streams 1028, event updates 1030, and the like to one or more databases that may be in communication with one or more streaming data source computers coupled to computer system 1000.

Computer system 1000 may be one of various types, including a handheld portable device, a wearable device, a personal computer, a workstation, a mainframe, a kiosk, a server rack, or any other data processing system. Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Some embodiments described herein make use of social networking data that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well.

In the preceding description, for the purposes of explanation, specific details are set forth in order to provide a thorough understanding of examples of the disclosure. However, it should be apparent that various examples may be practiced without these specific details. For example, circuits, systems, networks, processes, and other components may be shown as components in block diagram form in order to not obscure the examples in unnecessary detail. In other instances, well-known circuits, processes, algorithms, structures, and techniques may have been shown without necessary detail in order to avoid obscuring the examples. The figures and description are not intended to be restrictive.

The description provides examples only, and is not intended to limit the scope, applicability, or configuration of the disclosure. Rather, the description of the examples provides those skilled in the art with an enabling description for implementing an example. It should be understood that various changes may be made in the function and arrangement of elements without departing from the spirit and scope of the disclosure as set forth in the appended claims.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The term "machine-readable storage medium" or "computer-readable storage medium" includes, but is not limited to, portable or non-portable storage devices, optical storage devices, and various other mediums capable of storing, including, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. One or more processors may execute the software, firmware, middleware, microcode, the program code, or code segments to perform the necessary tasks.

Systems depicted in some of the figures may be provided in various configurations. In some embodiments, the systems may be configured as a distributed system where one or more components of the system are distributed across one or more networks such as in a cloud computing system.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The terms and expressions that have been employed in this disclosure are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although certain concepts and techniques have been specifically disclosed, modification and variation of these concepts and techniques may be resorted to by those skilled in the art, and that such modifications and variations are considered to be within the scope of the systems and methods as defined by this disclosure.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented as a computer program product including computer program code or instructions executable by one or more processors for performing any or all of the steps, operations, or processes described in this disclosure, where the computer program may be stored on a non-transitory computer readable medium. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
receiving, at a first system from a first user device associated with a user account, a first request to perform a save operation for a first web page when the first user device displays the first web page; and
responsive to receiving the first request:
determining, by the first system, an Uniform Resource Locator (URL) associated with the first web page;
determining the user account based upon the first request; and
causing information identifying the URL to be stored and associated with the user account, to enable a second user device associated with the user account to, when displaying a second web page and responsive to a second request to retrieve a stored URL, retrieve the URL from the user account based on a domain for the URL matching a domain for the second web page, and to display the first web page based on the URL.

2. The method of claim 1, further comprising:
sending a message to the first user device indicating successful completion of the save operation, wherein the message is sent in response to the information being caused to be stored and associated with the user account.

3. The method of claim 1 further comprising:
receiving, by the first system, information identifying the Uniform Resource Locator (URL);
obtaining, by the first system from a second system, the first web page corresponding to the URL;
communicating the web page from the first system to the first user device; and
causing a first user-selectable option to be displayed by the first user device when the first web page is displayed by the first user device;
wherein the first request is received upon selection of the first user-selectable option by a user of the first user device.

4. The method of claim 3, wherein the first user-selectable option is a button.

5. The method of claim 1 further comprising:
receiving, at the first system from the second user device, information indicating selection of a second user-selectable option displayed by the second user device; and
responsive to receiving the information indicating selection of the second user-selectable option:
determining a current URL associated with the second web page being displayed by the second user device when the second user-selectable option was selected;

identifying the domain for the current URL;
identifying, based upon the domain, one or more URLs stored for and associated with the user account, wherein a domain of each URL in the one or more URLs matches the domain for the current URL;
communicating, from the first system to the second user device, information identifying the one or more URLs;
receiving, by the first system from the second user device, information indicating selection of a particular URL from the one or more URLs; and
communicating, from the first system to the second user device, the first web page corresponding to the particular URL to enable the second user device to display the first web page,
wherein a first user-selectable option associated with a save operation for the first web page is not displayed with the first web page in the second user device based on the particular URL being stored for and associated with the user account.

6. The method of claim 5 further comprising:
obtaining, by the first system, the first web page corresponding to the particular URL from a web site storing the first web page.

7. The method of claim 1, wherein the first system causes the information to be to be stored and associated with the user account.

8. The method of claim 1, wherein the user account is an user account of multiple user accounts maintained by the first system.

9. The method of claim 1, wherein the first request includes an identification of the user account.

10. The method of claim 1, wherein the first system causes the information identifying the URL to be stored and associated with the user account.

11. A method comprising:
receiving, at a first system from a user device associated with an user account, information indicating selection of an user-selectable option displayed by the user device; and
responsive to receiving the information indicating selection of the user-selectable option:
determining a current Uniform Resource Locator (URL) associated with a first web page being displayed by the user device when the user-selectable option was selected;
identifying a domain for the current URL;
identifying, based upon the domain, one or more URLs stored by a user associated with the user account, wherein a domain of each URL in the one or more URLs matches the domain for the current URL;
communicating, from the first system to the user device, information identifying the one or more URLs;
receiving, by the first system from the user device, information indicating selection of a particular URL from the one or more URLs; and
communicating, from the first system to the user device, a second web page corresponding to the particular URL to cause the user device to display the second web page.

12. The method of claim 11, wherein the current URL is included in the information.

13. The method of claim 11 further comprising:
obtaining, by the first system, the second web page corresponding to the particular URL from a web site storing the second web page.

14. The method of claim 11, wherein the user-selectable option is a button.

15. The method of claim 11, wherein the user account is an user account of multiple user accounts maintained by the first system.

16. A non-transitory computer-readable storage medium storing a plurality of instructions executable by one or more processors, the plurality of instructions when executed by the one or more processors cause the one or more processors to:
receive, from a first user device associated with a user account, a first request to perform a save operation for a first web page when the first user device displays the first web page; and
responsive to receiving the first request:
determine an Uniform Resource Locator (URL) associated with the first web page;
determine the user account based upon the first request; and
cause information identifying the URL to be stored and associated with the user account, to enable a second user device associated with the user account to, when displaying a second web page and responsive to a second request to retrieve a stored URL, retrieve the URL from the user account based on a domain of the URL matching a domain of the second web page, and to display the first web page based on the URL.

17. The non-transitory computer-readable storage medium of claim 16, wherein the plurality of instructions when executed by the one or more processors further cause the one or more processors to:
send a message to the first user device indicating successful completion of the save operation, wherein the message is sent in response to the information being caused to be stored and associated with the user account.

18. The non-transitory computer-readable storage medium of claim 16, wherein the plurality of instructions when executed by the one or more processors further cause the one or more processors to:
receive information identifying the Uniform Resource Locator (URL);
obtain, from a remote system, the first web page corresponding to the URL;
communicate the first web page to the first user device; and
cause a first user-selectable option to be displayed by the first user device when the first web page is displayed by the first user device;
wherein the first request is received upon selection of the first user-selectable option by a user of the first user device.

19. The non-transitory computer-readable storage medium of claim 16, wherein the plurality of instructions when executed by the one or more processors further cause the one or more processors to:
receive, from the second user device, information indicating selection of a second user-selectable option displayed by the second user device; and
responsive to receiving the information indicating selection of the second user-selectable option:
determine a current URL associated with the second web page being displayed by the second user device when the second user-selectable option was selected;
identify the domain for the current URL;
identify, based upon the domain, one or more URLs stored for and associated with the user account, wherein a domain of each URL in the one or more URLs matches the domain for the current URL;

communicate, to the second user device, information identifying the one or more URLs;

receive, from the second user device, information indicating selection of a particular URL from the one or more URLs; and communicate, to the second user device, the first web page corresponding to the particular URL to enable the second user device to display the first web page, wherein a first user-selectable option associated with a save operation for the first web page is not displayed with the first web page in the second user device based on the particular URL being stored for and associated with the user account.

20. The non-transitory computer-readable storage medium of claim 16, wherein the user account is an user account of multiple user accounts.

21. The method of claim 1, wherein the first user device and the second user device are the same device.

22. The non-transitory computer-readable storage medium of claim 16, wherein the first user device and the second user device are the same device.

* * * * *